(12) United States Patent
Horita et al.

(10) Patent No.: US 6,626,139 B1
(45) Date of Patent: Sep. 30, 2003

(54) GEAR MECHANISM OF POWER TRANSMITTING SYSTEM

(75) Inventors: Yuji Horita, Nisshin (JP); Kouhei Hori, Aichi-gun (JP); Makoto Ishikawa, Nishikamo-gun (JP); Hiroshi Hosoi, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/869,104

(22) PCT Filed: Oct. 23, 2000

(86) PCT No.: PCT/IB00/01515

§ 371 (c)(1),
(2), (4) Date: Jun. 22, 2001

(87) PCT Pub. No.: WO01/33105

PCT Pub. Date: May 10, 2001

(30) Foreign Application Priority Data

Nov. 1, 1999 (JP) ............................................. 11-311637
Jan. 7, 2000 (JP) ....................................... 2000-001943

(51) Int. Cl.[7] ................................................ F02B 75/06
(52) U.S. Cl. .................................... 123/192.2; 464/180
(58) Field of Search ......................... 123/192.2, 192.1; 464/180

(56) References Cited

U.S. PATENT DOCUMENTS 4,987,987 A * 1/1991 Damon et al. ........... 192/106.1

FOREIGN PATENT DOCUMENTS

| JP | A 60-192145 | 9/1985 |
| JP | A 11-2290 | 1/1999 |
| JP | A 11-51120 | 2/1999 |
| JP | A 11-280842 | 10/1999 |
| JP | A 11-325185 | 11/1999 |

* cited by examiner

Primary Examiner—Noah P. Kamen
(74) Attorney, Agent, or Firm—Oliff & Berridge, PLC

(57) ABSTRACT

The present invention provides a gear mechanism of a power transmitting system, which includes a crank gear operatively coupled with a crankshaft, and a first driven gear that is coupled with a first balance shaft via a damping mechanism that allows relative rotation between the driven gear and the balance shaft. The damping mechanism includes a friction damper that generates frictional force when the first driven gear and a counter gear fixed to the first balance shaft rotate relative to each other within a predetermined rotational phase range or angle, and a stopper rubber or rubbers that elastically deforms to generate elastic force when the first driven gear and the first balance shaft rotate relative to each other beyond the predetermined rotational angle.

20 Claims, 20 Drawing Sheets

ROTATION DIRECTION OF
FIRST BALANCE SHAFT

GEAR MECHANISM OF POWER TRANSMITTING SYSTEM

BACKGROUND OF THE INVENTION

1. Field of the Invention

The present invention relates to a gear mechanism of a power transmitting system that is favorably used as a balancer apparatus of an internal combustion engine.

2. Discussion of Related Art

As well known in the art, in a balancer apparatus of an internal combustion engine, a balance shaft provided with an unbalance weight is operatively coupled with a crankshaft via a gear mechanism, whereby rotational force of the crankshaft is transmitted to the balance shaft. In the balancer apparatus, the balance shaft rotates in synchronization with the crankshaft, whereby inertial force generated by reciprocation of an engine piston is cancelled, and vibration of the engine is accordingly reduced.

Since explosive combustion in the internal combustion engine takes place intermittently, the magnitude of the rotational force transmitted from the crankshaft to the balance shaft is not constant or fixed, but rather is always fluctuating.

The inventors have confirmed that, among frequency components included in the fluctuations of the rotational force, a secondary component of a fundamental frequency that results from engine combustion occurring once in every two rotations of the crankshaft, and a sextic component that is amplified by torsional resonance of the crankshaft are relatively large compared to a component (primary component) of the fundamental frequency that is determined according to the speed of rotation of the crankshaft.

The balancer apparatus receives the rotational force including the vibration components of different frequencies as described above, and therefore vibration occurs in the gear mechanism, in particular, in a meshing portion(s) of the gears. Such vibration may result in generation of noise and reduction in the durability of the gears.

Thus, a balancer apparatus has been proposed wherein a damping mechanism formed by, for example, a spring or springs is inserted in a rotational-force transmission path from the crankshaft to the balance shaft so as to damp the vibration components of the rotational force.

In order to effectively damp a high-frequency component of the fluctuations in the rotational force, such as the sextic component of the fundamental frequency, by using the damping mechanism, the spring constant of the spring(s) must be set to a sufficiently low value so as to reduce the natural frequency of a vibration system formed by the balancer apparatus. However, if the spring constant is merely set to a low value, the spring(s) may be excessively deformed in response to a rapid increase in the rotational force transmitted from the crankshaft upon, for example, acceleration of the engine. Thus, the damping mechanism may be damaged due to the deformation. Moreover, characteristics of the spring may be substantially lost by so-called bottoming or the like, whereby the damping mechanism may cease to function properly.

In view of the above situation, a balancer apparatus in which a damping mechanism provides non-linear spring characteristics has been proposed in, for example, Japanese Laid-Open Patent Publication No. 60-192145.

FIG. 22 shows a cross-sectional structure of a main part of one example of the balancer apparatus. As shown in FIG. 22, the balancer apparatus includes a rotary shaft 100 operatively coupled with a balance shaft (not shown), and a generally cylindrical gear 110 that surrounds the outer periphery of the rotary shaft 100 and operatively coupled with a crankshaft (not shown). The rotary shaft 100 has a plurality of radially protruding driving pieces 102 formed on its outer periphery. The gear 110 also has a plurality of radially protruding driving pieces 112 formed on its inner periphery so as to be located between the corresponding driving pieces 102 of the rotary shaft 100.

Damper chambers 120 are formed between the respective driving pieces 102 of the rotary shaft 100 and the corresponding driving pieces 112 of the gear 110, and an elastic member 130 is disposed in each damper chamber 120. Moreover, clearances 132 are formed between each elastic member 130 and the corresponding driving pieces 102 and 112. In the balancer apparatus thus constructed, the driving pieces 102 and 112 and the elastic members 130 form the damping mechanism.

The operation of the damping mechanism will be now described. As the rotary shaft 100 rotates relative to the gear 110, the clearances 132 are reduced, and the driving pieces 102 and 112 then abut on the respective elastic members 130. As the rotary shaft 100 further rotates relative to the gear 110, the elastic members 130 are elastically deformed, thereby generating elastic force according to the amount of relative rotation. This elastic force (more specifically, torque based on this elastic force) acts against the relative rotation between the rotary shaft 100 and the gear 110.

Referring to FIG. 23, the solid line indicates the relationship between the angle θr of the relative rotation between the rotary shaft 100 and the gear 110 and the elastic force (torque) T. The two-dot chain line indicates the relationship between the relative rotational angle θr and the elastic force T in a comparative example. In the comparative example, the clearances 132 are not formed, and the natural frequency of the vibration system is reduced merely by setting the spring constant of the elastic members 130 to a low value.

As indicated by the solid line of FIG. 23, when the relative rotational angle θr is within a predetermined rotational phase range or angle (θr<θ1), the elastic members 130 are not elastically deformed, whereby the elastic force T is "zero". Thus, by forming the clearances 132 between each driving piece 102, 112 and the corresponding elastic members 130 so as to provide a relative rotational phase range in which the elastic force T is not produced, the natural frequency of the vibration system formed by the balancer apparatus can be reduced without significantly reducing the spring constant of the elastic members 130.

When the rotary shaft 100 and the gear 110 rotate relative to each other beyond the predetermined rotational angle (θr>θ1), the elastic force T increases with the relative rotational angle θr. As compared with the comparative example, the relative rotational angle θr is limited to a relatively small value even when the elastic force T becomes extremely large (T=Tmax), that is, when the rotational force transmitted from the crankshaft to the balancer apparatus becomes extremely large (θmax1<θmax2). Thus, the elastic members 130 are not excessively deformed.

Thus, according to the balancer apparatus, a high-frequency component of the fluctuation in rotational force can be damped without causing any damage and deterioration in the function of the damping mechanism when the rotational force from the crankshaft rapidly increases upon, for example, acceleration of the engine.

Such a damping mechanism having a non-linear spring characteristic can certainly reduce the natural frequency of the vibration system formed by the balancer apparatus, and damp the high-frequency component of the fluctuations in the rotational force, while avoiding any damage and deterioration in the function of the damping mechanism.

However, the reduction in the natural frequency of the vibration system may cause a problem as follows: the natural frequency is reduced to be equal to a frequency that is close to that of a low-frequency component, such as the secondary component of the fundamental frequency of the engine, which is included in the fluctuations in the rotational force. As a result, a resonance phenomenon occurs in the balancer apparatus due to the low-frequency component of the fluctuations in rotational force. Thus, vibration resulting from the resonance phenomenon cannot be prevented.

The aforementioned problem occurs not only in the above-described balancer apparatus of the internal combustion engine, but generally occurs in a gear mechanism of a power transmitting system that transmits rotational force by using gears.

SUMMARY OF THE INVENTION

The present invention has been developed in the light of the above situations. It is therefore an object of the present invention to provide a gear mechanism of a power transmitting system that is capable of favorably preventing or reducing the occurrence of a resonance phenomenon due to high-frequency and low-frequency components.

To accomplish the above object, the present invention provides for example a gear mechanism of a power transmitting system comprising first and second rotating members disposed coaxially with each other, and a damping mechanism interposed therebetween, wherein the damping mechanism includes a damping member that generates damping force for limiting relative rotation between the first and second rotating members, and at least one elastic member that elastically deforms mainly when an angle of relative rotation between the first and second rotating members exceeds a predetermined rotational angle, so as to apply elastic force onto the rotating members in a direction opposite to that of the relative rotation.

The gear mechanism as described above may be applied to a construction comprising a first gear operatively coupled with a first rotary shaft and meshing with a second gear provided on a second rotary shaft, wherein the second gear forms one of the rotating members and the second rotary shaft forms the other rotating member.

With the gear mechanism constructed as described above, the elastic force of the elastic member is generated mainly when the two coaxially disposed rotating members (the second gear and the second rotary shaft in the above application) rotate relative to each other beyond the predetermined rotational angle. Therefore, the natural frequency of a vibration system including the gear mechanism can be reduced without significant reduction in the spring constant of the elastic member. As a result, a high-frequency component of fluctuations in rotational force can be damped while avoiding any damage and degradation in the function of the damping mechanism. When the two coaxially disposed rotating members rotate relative to each other within the predetermined rotational phase range or angle, on the other hand, the damping member generates damping force for limiting the relative rotation between the rotating members. Therefore, the damping capability of the damping mechanism can be enhanced, and a low-frequency component of the fluctuations in the rotational force can also be damped.

Thus, even where the rotational force including both low-frequency and high-frequency components as vibration components is transmitted to the gear mechanism constructed according to the present invention, occurrence of a resonance phenomenon due to the low-frequency and high-frequency components can be advantageously prevented without causing any damage or degradation in the function of the damping mechanism.

In one preferred form of the present invention, the damping member comprises a friction damping member that is located between the two rotating members, so as to generate the damping force in the form of friction force that arises due to relative rotation between the two rotating members.

With the gear mechanism constructed as described above, the damping force does not significantly change with a change in the speed at which the two rotating members rotate relative to each other, and may be held substantially constant. Therefore, the capability of damping, in particular, a low-frequency component of the fluctuations in rotational force can be improved as compared with a structure that uses a so-called oil damper or the like as the damping member. As a result, occurrence of a resonance phenomenon due to the low-frequency component can be further advantageously suppressed or prevented.

In a further preferred form of the present invention, each of the at least one elastic member comprises a main deformation portion arranged at an acceleration side of the elastic member that elastically deforms mainly when the two rotating members rotate relative to each other beyond the predetermined rotational angle as the rotational force transmitted between the two rotating members increases or is kept substantially constant, and a sub deformation portion arranged at a deceleration side of the elastic member that elastically deforms mainly when the two rotating members rotate relative to each other beyond the predetermined rotational angle as the rotational force transmitted between the two rotating members decreases, the acceleration-side elastic portion having a greater limit to elastic deformation thereof than that of the deceleration-side elastic portion.

With the gear structure constructed as described above, the acceleration-side elastic portion elastically deforms when the two rotating members rotate relative to each other beyond the predetermined rotational angle not only in the case where the rotational force increases but also in the case where the rotational force is kept substantially constant. Thus, the acceleration-side elastic portion functions to transmit the rotational force between the two rotating members. Therefore, the acceleration-side elastic portion is more frequently subjected to elastic deformation than the deceleration-side elastic portion.

In view of the above, the damping mechanism of the invention may be constructed such that the main deformation portion has a greater limit to elastic deformation thereof than that of the sub deformation portion. Thus, the main deformation portion is allowed to elastically deform to a greater extent, thus assuring improved durability of the elastic member(s).

In the above preferred form of the invention, the main deformation portion and the sub deformation portion may be formed of a rubber material, and the main deformation portion may have an elastically deformable portion whose volume is larger than that of an elastically deformable portion of the sub deformation portion.

At least one of the two rotating members may comprise a gear meshing with a respective counter gear.

In the gear mechanism of the present invention, at least one of the gear and the counter gear may be a resin gear whose teeth comprise a resin material.

In the above structure, impact that acts on a meshing portion between the meshing gears is absorbed, and gear meshing noise can be thus reduced. Furthermore, the fluctuations in the rotational force transmitted between the gears, in particular, its high-frequency component, can be advantageously damped.

Also, in the case where the other of the meshing gears that meshes with the resin gear is a metal gear, the gear meshing noise can be reduced even if the working accuracy of a tooth surface of the metal gear is relatively low. This makes it possible to eliminate some process steps, such as shaving and polishing the tooth surface of the metal gear, and backlash control by selection and adjustment of a shim commonly used for forming metal gears. Moreover, since resin gears are respectively meshed with metal gears in the gear mechanism, disadvantages such as thermal adhesion between the gears can be avoided.

In the gear mechanism as described above, one of the meshing gears may be a resin gear whose teeth are formed of a resin material, while the other of the meshing gears may be a metal gear whose teeth are formed of a metal, and the resin gear may have a tooth width that is larger than that of the metal gear.

In the case where the resin gear and the metal gear mesh with each other, respective tooth positions of the gears may be displaced from each other in the tooth-width direction of the gears due to an error in mounting the gears, vibration during rotation, and the like. In such a case, only a local portion of the tooth surface of the resin gear abuts on the tooth surface of the metal gear, resulting in so-called local abutment. Since the resin gear is generally less wear-resistant and less durable than the metal gear, the resin gear may further be worn and/or damaged as a result of the local abutment.

In view of the above point, the gear mechanism of the present invention may be constructed such that the resin gear has a tooth width that is larger than that of the metal gear. Therefore, even if the respective tooth positions of the gears are displaced from each other, the displacement is covered, and abutment of local portions of the resin and metal gears is avoided. As a result, otherwise possible wear and damage of the resin gear resulting from the displacement can be suppressed or prevented.

In the gear mechanism as described above, at least one elastic member may be provided on one of the two rotating members, and at least one abutting member may be provided on the other of the two rotating members, each abutting member abutting on the corresponding elastic member to cause elastic deformation thereof when the two rotating members rotate relative to each other beyond the predetermined rotational angle. In this arrangement, the strength of each abutting member as measured upon breakage of the abutting member due to elastic force of the corresponding elastic member acting thereon may be set to be smaller than the strength of a toothed portion of one of the meshing gears that is formed as the resin gear.

In the case where at least one of the gears is a resin gear, a toothed portion of the resin gear may be broken when it receives excessive rotational force since the strength of the resin gear is lower than that of a metal gear. This may result in a problem such as biting of the gears.

In this respect, the gear mechanism of the invention may be constructed such that the abutting member is broken prior to breakage of the toothed portion of the resin gear, whereby mechanical coupling force between the two rotating members is rapidly reduced. With this arrangement, the breakage of the toothed portion of the resin gear upon receipt of the excessive rotational force is avoided, whereby the problem such as biting of the gears can be prevented in advance.

In another preferred form of the present invention, the damping mechanism comprises a plurality of elastic members as the above-indicated at least one elastic member, each of which is provided on one of the two rotating members, and a plurality of abutting members corresponding to the respective elastic members are provided on the other of the two rotating members, for abutting on the corresponding elastic members to cause elastic deformation thereof when the two rotating members rotate relative to each other beyond the predetermined rotational angle. Furthermore, the elastic members are located with respect to the one of the two rotating members such that different angles of relative rotation between the two rotating members are formed when the respective elastic members successively abut on the corresponding abutting members.

With the above arrangement, the elastic members as a whole exhibit an even more non-linear elastic characteristic when the two rotating members rotate relative to each other. Therefore, the natural frequency of the vibration system including the gear mechanism is dispersed or diversified into a plurality of frequencies, whereby the damping capability of the damping mechanism is further enhanced. As a result, occurrence of the resonance phenomenon can be suppressed in a further preferable manner.

In a further preferred form of the invention, the damping mechanism comprises a plurality of elastic members, each of which is provided on one of the rotating members, and a plurality of abutting members corresponding to the respective elastic members, each of which is provided on the other of the rotating members for abutting on the corresponding elastic members to cause elastic deformation thereof when the rotating members rotate relative to each other beyond the predetermined relative rotational angle, wherein the elastic members and the abutting members are located with respect to the rotating members such that the elastic members and the abutting members are spaced from each other at equal intervals in a direction of rotation of the rotating members, and wherein the number of teeth of the gear being coupled by the gear mechanism is set to an integral multiple of the number of the elastic members.

Thus an increased degree of freedom with which the gear is mounted may be achieved.

In a further preferred form of the invention, the predetermined relative rotational angle is defined by the sum of angles by which each abutting member is spaced from corresponding end faces of the above-indicated at least one elastic member which face the abutting member, as viewed in a direction of rotation of the rotating members.

The present invention may be applied to an internal combustion engine comprising a crankshaft, at least one balance shaft and a gear mechanism according to the invention, wherein the at least one balance shaft is driven by a rotational torque of the crankshaft.

In a further preferred form of the invention, the gear mechanism is arranged at the first balance shaft and comprises a driven gear being disposed on the first balance shaft and rotatable relative thereto, and wherein the driven gear is driven by a crank gear being fixedly secured on the crankshaft.

In a still further preferred form of the invention, the gear mechanism is arranged at the crank shaft and comprises a crank gear being disposed on the crankshaft and rotatable relative thereto, and wherein the crank gear drives a driven gear being fixedly secured on the first balance shaft.

The internal combustion engine may comprise a second balance shaft being operatively coupled with the first balance shaft.

In a further form of the invention, the second balance shaft may be driven by the crankshaft via the crank gear, an intermediate gear being disposed on an intermediate shaft and meshing with the crank gear, a driven gear being disposed on the second balance shaft and rotatable relative thereto and meshing with the intermediate gear, and an additional gear mechanism connecting between the driven gear and the second balance shaft.

DETAILED DESCRIPTION OF THE PREFERRED EMBODIMENTS

First Embodiment

The first embodiment of the present invention will be described with reference to FIGS. 1 to 9. In the first embodiment, a gear mechanism constructed according to the present invention is employed as a balancer apparatus of an in-line four-cylinder internal combustion engine.

Figure 1:
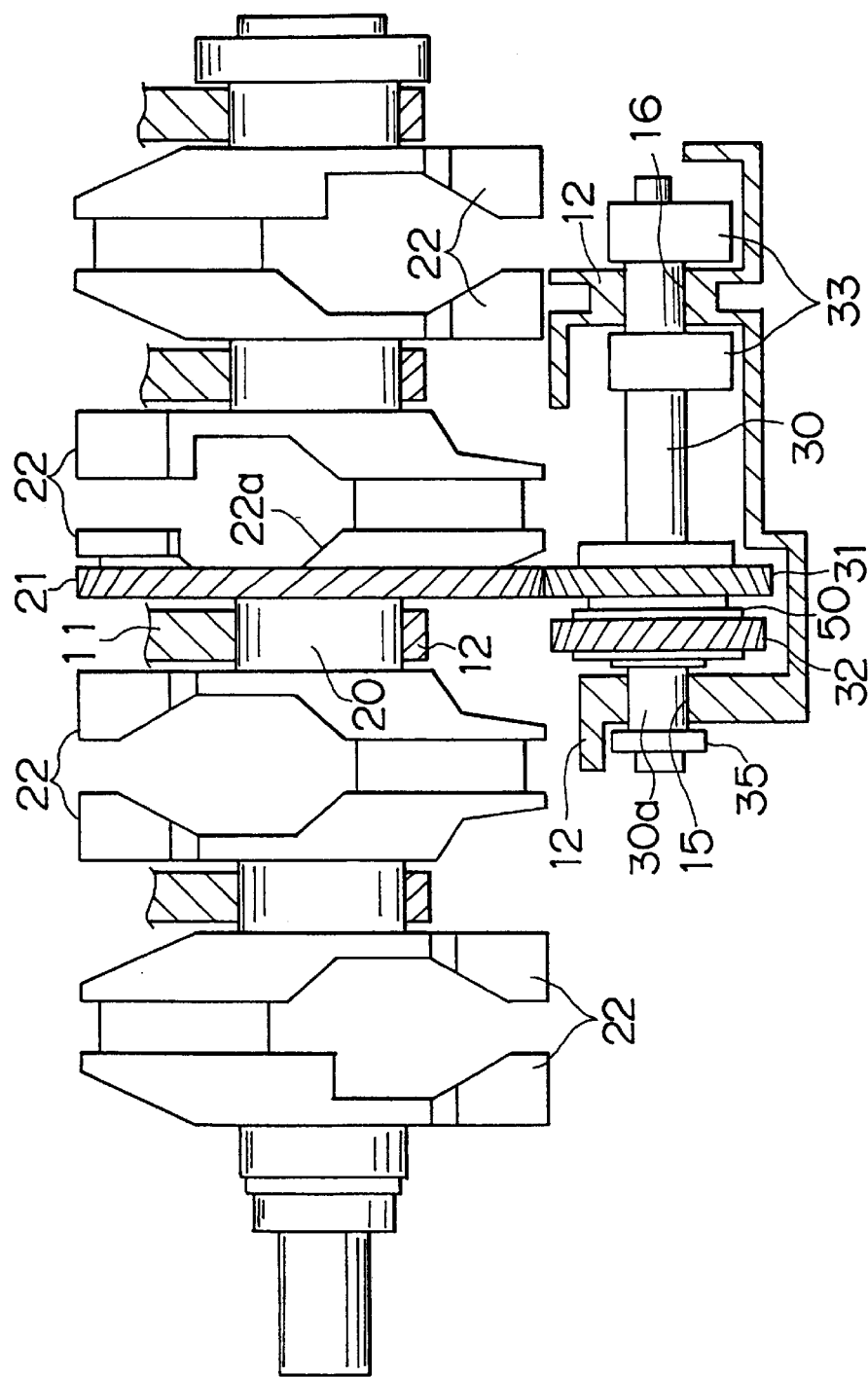
FIG. 1 is a side view schematically showing the construction of a gear mechanism according to the first embodiment of the present invention, which gear mechanism is employed in a balancer apparatus of an internal combustion engine.
Figure 2:
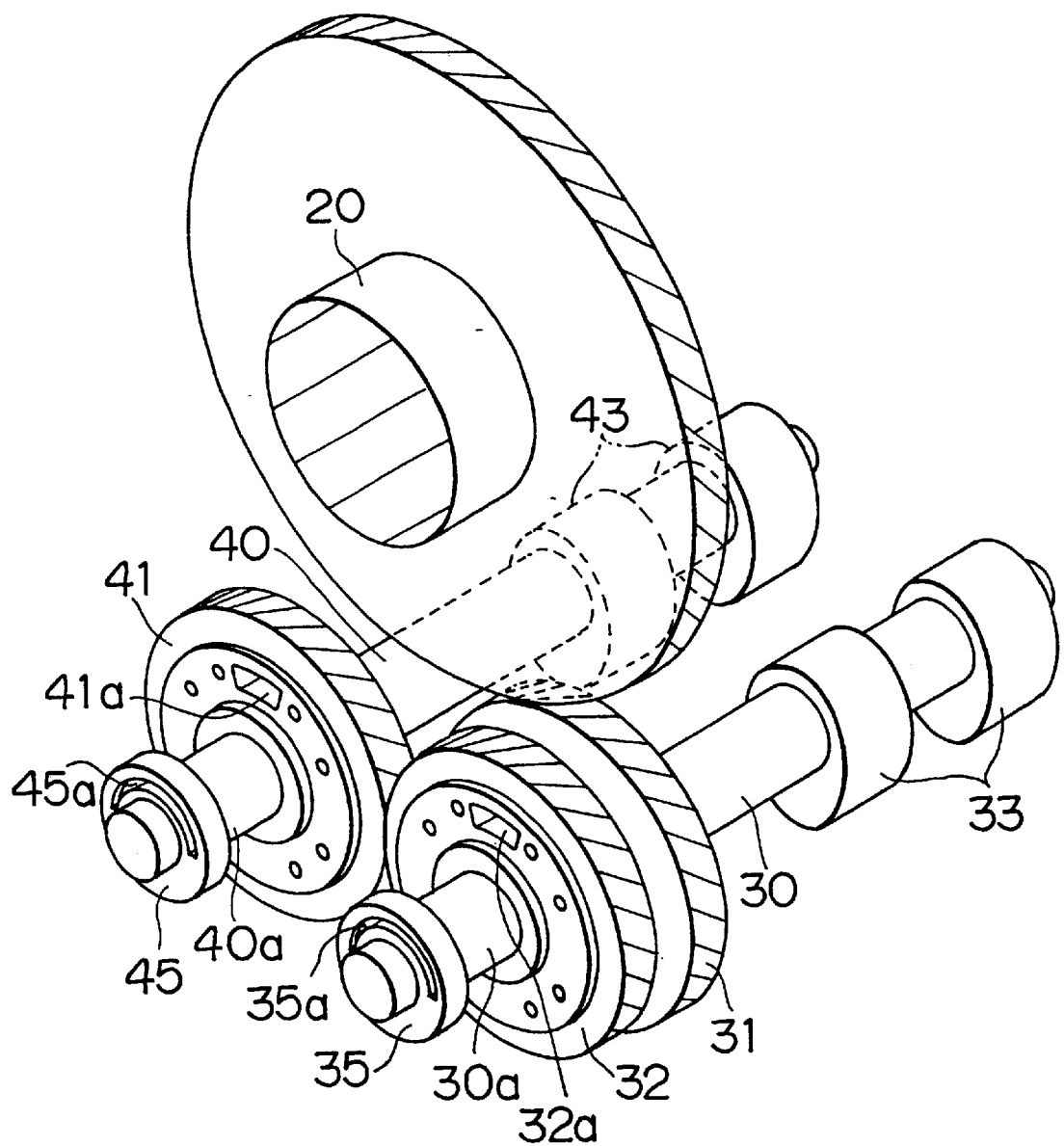
FIG. 2 is a perspective view showing the meshing relationship of gears in the gear mechanism of the first embodiment of the present invention.

First, the balancer apparatus that employs the gear mechanism of the present invention will be briefly described with reference to FIGS. 1 and 2. FIG. 1 is a schematic view showing the structure of the balancer apparatus as viewed from one side thereof, and FIG. 2 is a schematic view showing the gear arrangement of the balancer apparatus.

As shown in these figures, the balancer apparatus includes a crankshaft 20 as an output shaft of the engine that is supported by a cylinder block 11 and a crank case 12 (shown in FIG. 1) of the engine, and first and second balance shafts 30 and 40 disposed below the crankshaft 20 in parallel therewith.

Each balance shaft 30, 40 is supported by first and second radial bearings 15 and 16 formed by the crank case 12 and a housing. It is, however, to be noted that only the radial bearings 15 and 16 supporting the first balance shaft 30 are illustrated in FIG. 1, and the radial bearings 15 and 16 for the first and second balance shafts 30, 40 are not illustrated in FIG. 2. A pair of unbalance weights 33, 43 are mounted on each balance shaft 30, 40 such that the corresponding second radial bearing 16 is interposed between the weights 33, 43.

A pair of balance weights 22 per cylinder, that is, eight balance weights 22 in total, are mounted on the crankshaft 20. Moreover, a crank gear 21 that rotates as a unit with the crankshaft 20 is mounted on the crankshaft 20 at a position adjacent to a middle balance weight 22a as one of the balance weights 22.

The first balance shaft 30 is provided with a first driven gear 31. The first driven gear 31 meshes with the crank gear 21, and is rotatable relative to the first balance shaft 30. The first driven gear 31 has a diameter that is equal to the radius of the crank gear 21. Moreover, the first balance shaft 30 is provided with a counter gear 32 located adjacent to the first radial bearing 15. The counter gear 32 is press-fitted on the first balance shaft 30, and is coupled to be rotatable together with the first balance shaft 30. The first driven gear 31 is operatively coupled with the counter gear 32 via a damping mechanism 50 that allows relative rotation between the gears 31, 32.

As shown in FIG. 2, the second balance shaft 40 is provided with a second driven gear 41 located adjacent to the first radial bearing 15 (not shown in FIG. 2). The second driven gear 41 meshes with the counter gear 32, and is coupled to be rotatable together with the second balance shaft 40.

At the respective ends of the balance shafts 30 and 40, thrust bearings 35 and 45 for limiting axial movement of the respective balance shafts 30 and 40 are disposed adjacent to the respective first radial bearings 15. Each thrust bearing 35, 45 has a recess 35a, 45a formed in its portion located opposite to the center of gravity of the unbalance weights 33, 43 (i.e., the lower side of FIG. 2) with respect to the central axis of the corresponding balance shaft 30, 40. Similarly, each of the counter gear 32 and the second driven gear 41 has a recess 32a, 41a formed in its portion located opposite to the center of gravity of the unbalance weights 33, 43 (i.e., the lower side of FIG. 2) with respect to the central axis of the corresponding balance shaft 30, 40.

With the recesses 32a, 35a, 41a and 45a thus formed, the respective centers of gravity of the counter gear 32, the second driven gear 41 and the thrust bearings 35 and 45 are shifted or made eccentric to be on the same side as that of the centers of gravity of the unbalance weights 33 and 43. Accordingly, the counter gear 32, the second driven gear 41 and the thrust bearings 35 and 45 perform substantially the same function as the unbalance weights 33 and 43, when they rotate together with the balance shafts 30 and 40. As a result, the size and weight of the unbalance weights 33 and 43 can be reduced by the amounts corresponding to the volume of the recesses 32a, 35a, 41a and 45a.

Moreover, as described above, the respective centers of gravity of the counter gear 32, the second driven gear 41 and the thrust bearings 35 and 45 are offset from the respective central axes of the balance shafts 30 and 40. As the elements 32, 35, 41 and 45 rotate, therefore, the balance shafts 30 and 40 are subjected to centrifugal force about the respective central axes of the balance shafts 30 and 40, at their portions 30a and 40a supported by the corresponding first radial bearings 15.

Accordingly, the balance shafts 30 and 40 rotate with their supported portions 30a and 40a being pressed against the respective inner circumferential surfaces of the first radial bearings 15 by the centrifugal force. As a result, irregular or non-uniform vibration that would otherwise occur at the supported portions 30a and 40a can be suppressed when the balance shafts 30 and 40 rotate, whereby contact noise that would be generated between each of the portion 30a and 40a and the inner surface of the corresponding first radial bearing 15 can be reduced.

Figure 5:
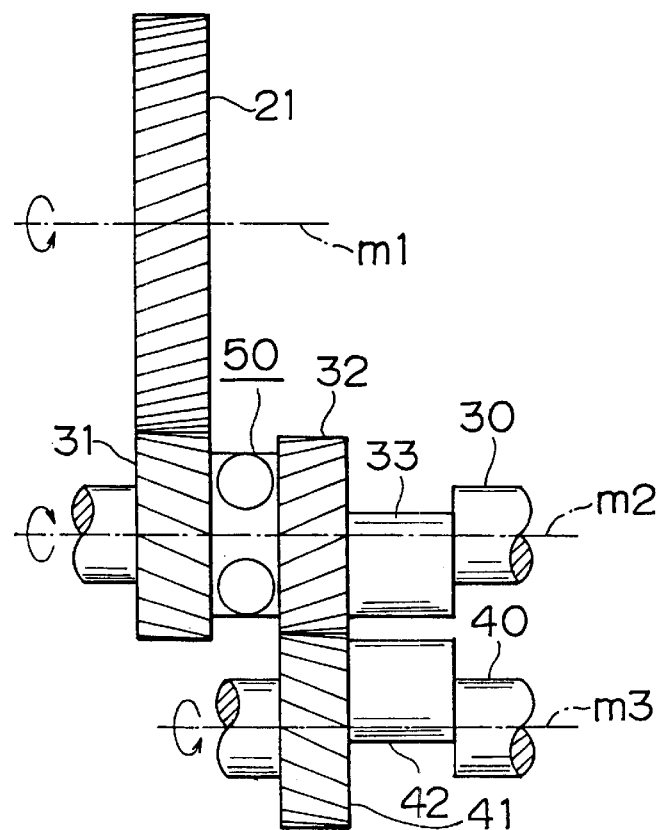
FIG. 5 is a schematic diagram showing the gears meshing with each other in the gear mechanism of the first embodiment.

FIG. 5 schematically shows the relationship between the gears and the shafts. With the balancer apparatus of the engine constructed in the above manner, rotational force is transmitted from the crankshaft 20 to the first balance shaft 30, through the crank gear 21, the first driven gear 31, the damping mechanism 50 and the counter gear 32, and is further transmitted from the counter gear 32 to the second balance shaft 40 through the second driven gear 41. In FIG. 5, reference characters "m1", "m2" and "m3" denote the central axes of the crankshaft 20, the first balance shaft 30 and the second balance shaft 40, respectively.

Figure 3:
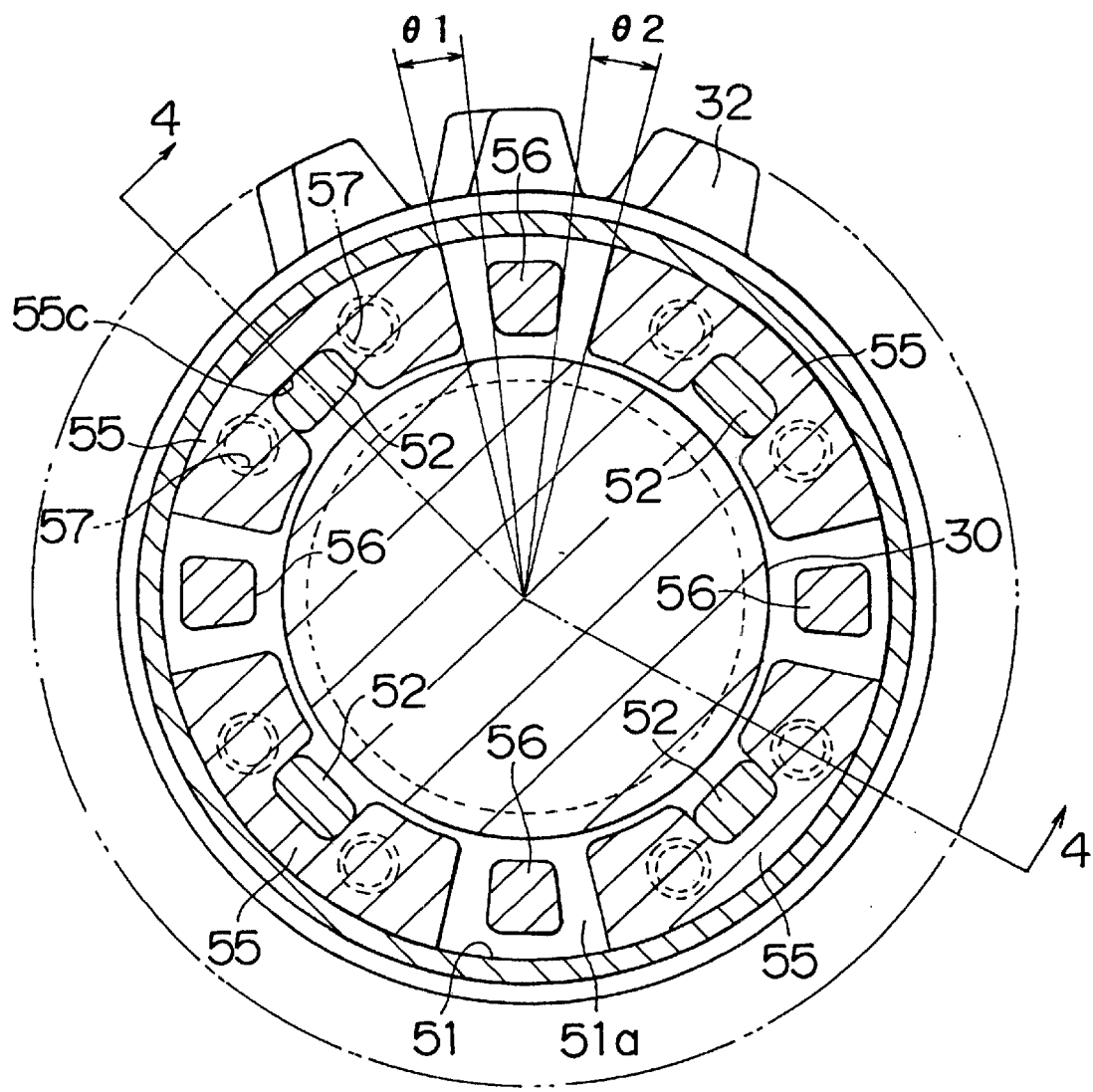
FIG. 3 is a cross-sectional view showing the construction of a damping mechanism of the gear mechanism of the first embodiment.

Hereinafter, the structure of the damping mechanism 50 will be described with reference to FIGS. 3 and 4, each showing a cross section of the damping mechanism 50 mounted on the first balance shaft 30. More specifically, FIG. 3 is a cross-sectional view taken along line 3—3 of FIG. 4, and FIG. 4 is a cross-sectional view taken along line 4—4 of FIG. 3.

Figure 4:
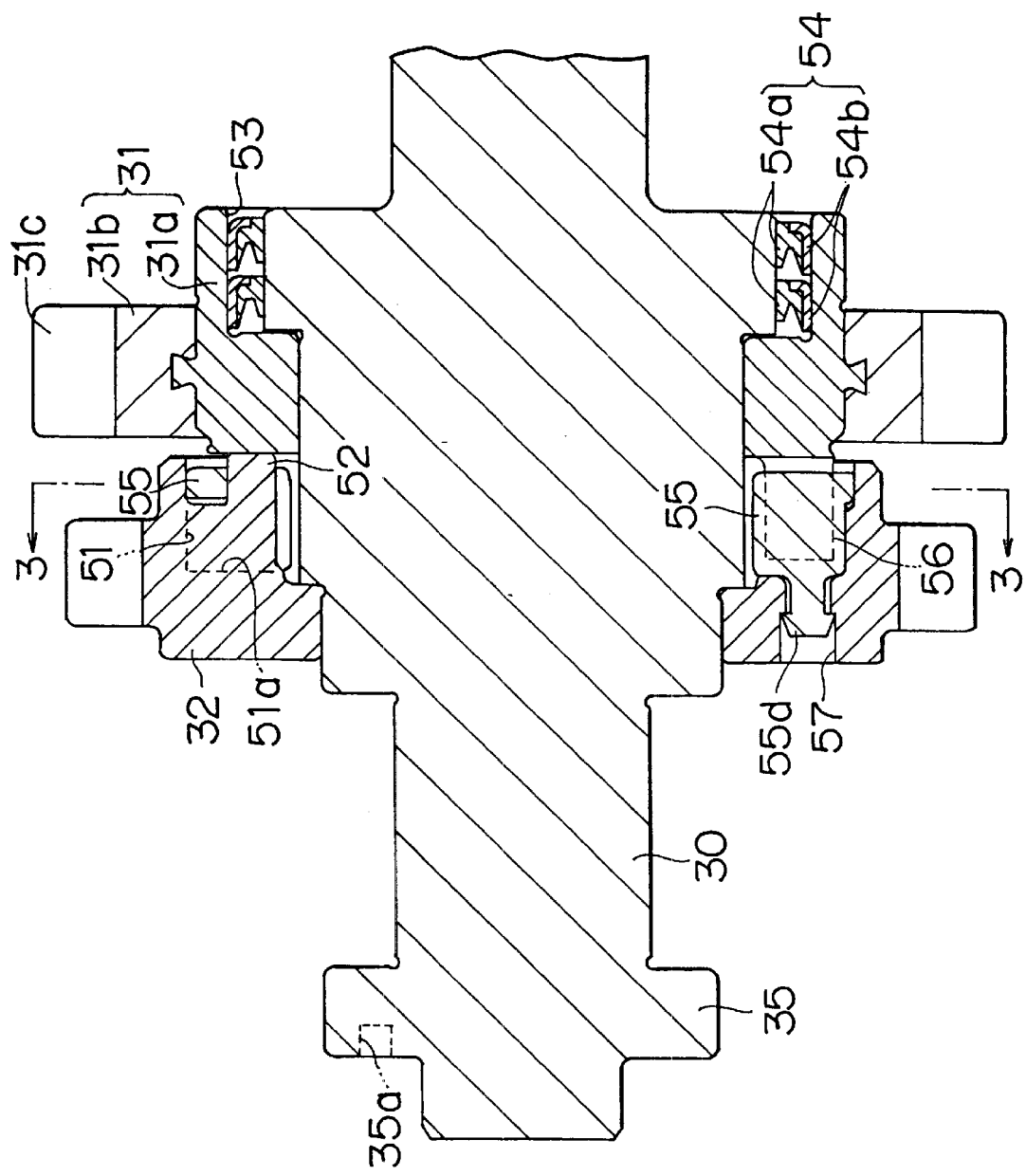
FIG. 4 is a cross-sectional view taken along line 4—4 of FIG. 3.

As shown in FIG. 4, the first driven gear 31 includes an annular, radially inner portion 31a that is disposed coaxially with the first balance shaft 30 so as to be rotatable relative to the first balance shaft 30, and a radially outer portion 31b that is disposed on the outer periphery of the radially inner portion 31a so as to be rotatable together with the radially inner portion 31a. The radially outer portion 31b has teeth 31c formed on its outer periphery. The teeth 31c of the radially outer portion 31b mesh with teeth (not shown) formed on the outer periphery of the crank gear 21. Note that, in the present embodiment, the teeth 31c of the radially outer portion 31b have the same tooth width as that of the teeth of the crank gear 21. Moreover, the counter gear 32 has the same tooth width as that of the second driven gear 41 that meshes with the counter gear 32.

The radially inner portion 31a of the first driven gear 31 is formed of a metal such as iron, while its radially outer portion 31b is formed of a resin material consisting of a thermosetting resin, such as polyamino amide or phenol, that is reinforced by aramid-fiber fabric. Similarly, at least the teeth of the second driven gear 41 are formed of the above-described resin material. The crank gear 21 and the counter gear 32 are both formed of a metal, such as iron. As shown in FIG. 5, these gears 21, 31, 32 and 41 are helical gears formed with helical teeth.

The radially inner portion 31a of the first driven gear 31 has a recess 53 formed on the side opposite to that facing the counter gear 32. The recess 53 is formed about the central axis of the first balance shaft 30 so that the inner portion 31a that radially defines the recess 53 has an inside diameter that is larger than the outside diameter of the first balance shaft 30. With the first driven gear 31 engaging with the first balance shaft 30, therefore, an annular space is formed between the outer circumferential surface of the first balance shaft 30 and the inner circumferential surface of the radially inner portion 31a (or the inner wall of the recess 53). A pair of annular friction dampers 54 serving as damping members are disposed in the annular space.

Each friction damper 54 includes an elastic portion 54a formed of an elastic material such as a rubber material, and a sliding portion 54b formed of a metal and abutting on the inner wall surface of the recess 53. The first driven gear 31 is always biased outwards in the radial direction over the entire circumference of the first balance shaft 30, due to elastic force generated by the elastic portions 54a of the friction dampers 54.

Accordingly, when the first driven gear 31 rotates relative to the counter gear 32, namely, when the first driven gear 31 rotates relative to the first balance shaft 30, frictional force corresponding to the magnitude of the biasing force is generated between the sliding portions 54b and the inner wall surface of the recess 53. The frictional force serves as damping force that acts against relative rotation between the first drive gear 31 and the counter gear 32.

The crank gear 21 and the first driven gear 31 are formed as helical gears. Therefore, the first driven gear 31 can slightly move in the axial direction of the first balance shaft 30 even with the crank gear 21 and the first driven gear 31 meshing with each other. As a result, the first driven gear 31 may vibrate in the axial direction of the first balance shaft 30 due to fluctuations in rotational force or the like, and may be repeatedly brought into contact with the first balance shaft 30, thereby possibly generating noise. The frictional force of the friction dampers 54 also acts as damping force for damping the vibration of the first driven gear 31.

The counter gear 32 has an annular recess 51 formed on the side facing the first driven gear 31. The recess 51 is formed about the central axis of the first balance shaft 30 so as to surround the outer periphery of the first balance shaft 30. A plurality of engaging projections 52 (in this example, four engaging projections as shown in FIG. 3) projecting toward the first driven gear 31 are formed on an inner bottom surface 51a of the recess 51 at equal angular intervals about the central axis of the first balance shaft 30. These engaging projections 52 have a generally rectangular shape in cross section. Moreover, a pair of engaging holes 57 are formed in the inner bottom surface 51a of the recess 51 at positions that interpose each of the engaging projections 52 therebetween.

Furthermore, a plurality of stopper rubbers 55 (four stopper rubbers in this example) that engage with the respective engaging projections 52 and engaging holes 57 are provided in the recess 51 at equal angular intervals about the central axis of the first balance shaft 30. These stopper rubbers 55 have a generally trapezoidal shape in cross section.

Each stopper rubber 55 has an engaging recess 55c that engages with the corresponding engaging projection 52, and engaging pieces 55d that engage with the corresponding pair of engaging holes 57. Such engagement between the engaging projections 52 and the engaging recesses 55c and engagement between the engaging pieces 55d and the engaging holes 57 limit movement of the stopper rubbers 55 in the circumferential direction within the recess 51. In the present embodiment, portions of each stopper rubber 55 that are located on both sides of the corresponding engaging projection 52 while the stopper rubber 55 is engaged with the engaging projection 52 have the same length or dimension in the circumferential direction. In addition, the spring constant of each stopper rubber 55 is set or controlled so as not to cause excessive deformation leading a damage even when the maximum rotational force is applied from the crankshaft 20 to the balancer apparatus.

The radially inner portion 31a of the first driven gear 31 has a plurality of projections 56 (four projections in this example) formed on the side facing the counter, gear 32. These projections 56 projecting toward the counter gear 32 are provided at equal angular intervals about the central axis of the first balance shaft 30. More specifically, each projection 56 is spaced apart from the opposed ends of the adjacent two stopper rubbers 55 by predetermined angles θ1 and θ2, respectively. Although the predetermined angles θ1 and θ2 vary as the first driven gear 31 and the counter gear 32 rotate relative to each other, the sum (θ1+θ2) of these angles is a fixed value θmax (θmax=θ1+θ2).

Accordingly, the first driven gear 31 and the counter gear 32 can rotate relative to each other within a predetermined rotational angle (=θmax) that is equal to the sum of the predetermined angles θ1 and θ2 (=θ1+θ2), before each projection 56 abuts on either end of the adjacent stopper rubbers 55. In other words, when the first driven gear 31 and the counter gear 32 rotate relative to each other beyond the predetermined rotational angle θmax, each projection 56 abuts on one end of the corresponding stopper rubber 55. In the present embodiment, the predetermined rotational angle θmax is set to "16°."

Moreover, in the present embodiment, the number of teeth 31c of the first driven gear 31 is set to an integral multiple of the number of stopper rubbers 55. More specifically, the number of teeth 31c "p" and the number of stopper rubbers 55 "s" have the relationship defined by the following equation (1):

$$p = n \cdot s \qquad (1)$$

where "s" and "n" are integers equal to or larger than 2.

In the balancer apparatus, the balance shafts 30 and 40 need be mounted so that respective rotational phases of the crankshaft 20 and each balance shaft 30, 40 have a predetermined relationship. Upon mounting of the balance shafts 30 and 40, therefore, respective positions of the balance shafts 30 and 40 in the direction of rotation thereof are uniquely determined if the position of the crankshaft 20 in direction of rotation thereof is determined.

When the first driven gear 31 is meshed with the crank gear 21 with the respective positions of the balance shafts 30 and 40 thus determined, the position of the first driven gear 31 in the direction of rotation thereof is also determined. When the counter gear 32 is subsequently assembled with the first balance shaft 30, therefore, it is required to locate each projection 56 of the first driven gear 31 between the adjacent stopper rubbers 55 on the side of the counter gear 32, while meshing the counter gear 32 with the teeth of the second driven gear 41 that is fixed to the second balance shaft 40.

If the number "p" of teeth 31c of the first driven gear 31 and the number "s" of stop rubbers 55 are set to those having a relationship of p≠n·s, unlike the present embodiment, there is only one way or manner in which the first driven gear 31 and the stopper rubbers 55 are positioned such that each projection 56 is located in a space between the adjacent stopper rubbers 55. Accordingly, if the angular position of the first drive gear 31 meshing with the crank gear 21 is not appropriate, each projection 56 cannot be located between the adjacent stopper rubbers 55 when the counter gear 32 is brought into engagement with the first balance shaft 30 as described above. Thus, the first driven gear 31 need be engaged with the crank gear 21 so as to be positioned at the only position that permits subsequent mounting of the counter gear 32.

In the present embodiment, on the other hand, the teeth 31c are formed at every (360/n·s)° in the circumferential direction of the first driven gear 31, and the projections 56 are formed at every (360/s)° in the circumferential direction of the first driven gear 31. Accordingly, an angular interval between the projections 56 is an integral multiple of that between the teeth 31c. Thus, the teeth 31a of the first driven gear 31 are located at the same position no matter which one of the projections 56 is located in a space between adjacent stopper rubbers 55. As a result, the first driven gear 31 can be meshed with the crank gear 21 at a plurality of positions (four positions in the present embodiment) while permitting subsequent mounting of the counter gear 32, thus assuring an increased degree of freedom with which the counter gear 32 is mounted.

Figure 6:
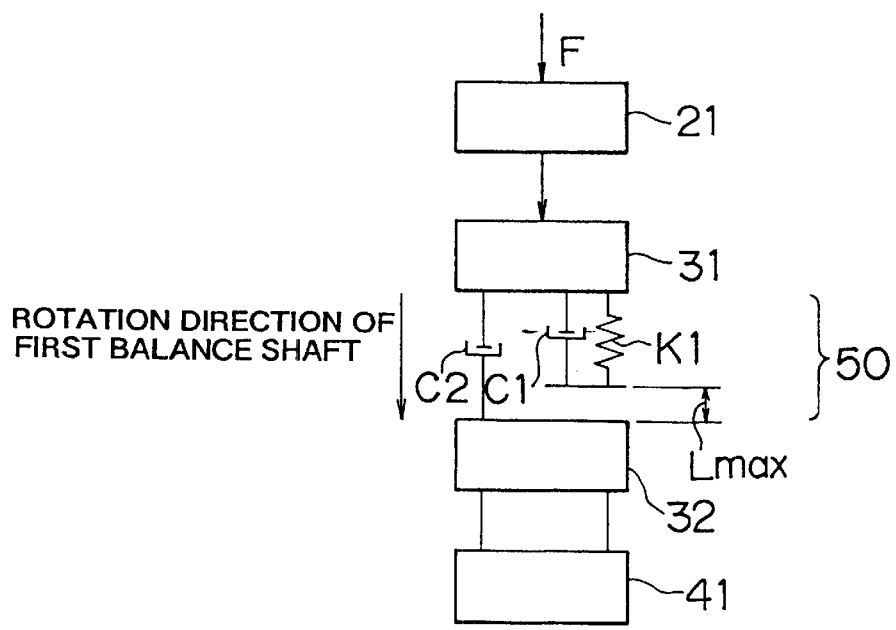
FIG. 6 is a diagram modelling the gear mechanism of the first embodiment.

The balancer apparatus having the damping mechanism 50 as described above can be represented by a model as illustrated in FIG. 6.

First, when the rotational force F is transmitted from the crankshaft 20 to the crank gear 21, the first driven gear 31 rotates relative to the counter gear 32 with only the frictional force of the friction dampers 54 acting as damping force (damping coefficient C2), until the angle of rotation of the first driven gear 31 relative to the counter gear 32 exceeds the predetermined rotational angle θmax, that is, until the projections 56 abut on the respective stopper rubbers 55.

When the first driven gear 31 rotates relative to the counter gear 32 beyond the predetermined rotational angle θmax, the projections 56 abut on the corresponding ends of the stopper rubbers 55, whereby the stopper rubbers 55 are elastically deformed in the circumferential direction thereof. As a result, the elastic force (spring constant K1) and damping force (damping coefficient C1) of the stopper rubbers 55 as a whole in addition to the damping force of the friction dampers 54 act against the relative rotation between first driven shaft 31 and the counter gear 32. Thus, the rotational force F transmitted to the first driven gear 31 is transmitted to the first balance shaft 30 through the counter gear 32 and is then transmitted from the counter gear 32 to the second balance shaft 40 through the second driven gear 41, as the resultant force of the damping force of the friction dampers 54 and the elastic force and damping force of the stopper rubbers 55.

Hereinafter, a vibration suppressing effect of the gear mechanism according to the present embodiment will be described with reference to FIGS. 7 to 9.

Figure 7:
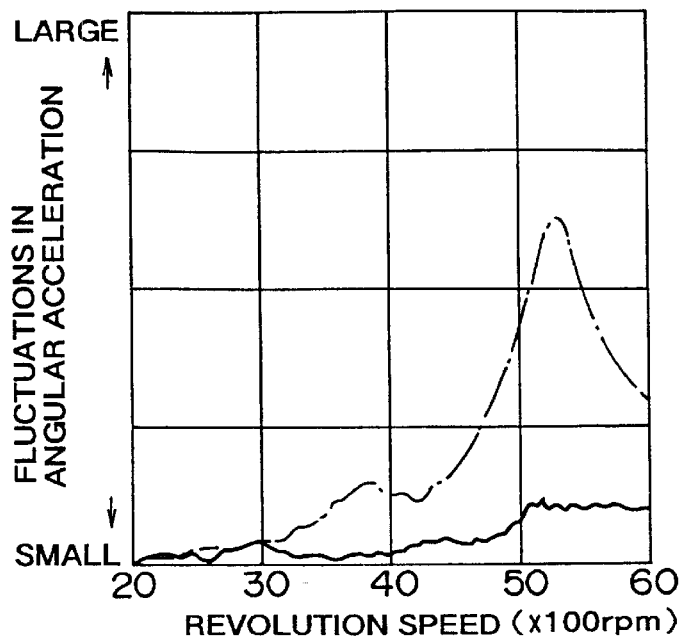
FIG. 7 is a graph showing a characteristic of fluctuations in the angular acceleration of a balance shaft in relation to the speed of revolution of the internal combustion engine.

FIG. 7 is a graph showing experimental results regarding changes in fluctuations of angular acceleration of the first and second balance shafts 30 and 40 with respect to the speed of revolution of the internal combustion engine.

In FIG. 7, the solid line indicates a characteristic of the present embodiment, and the one-dot chain line indicates a characteristic of a comparative example. In the comparative example, the damping mechanism 50 is omitted, and the first driven gear 31 and the counter gear 32 are directly operatively coupled with each other so that the gears 31 and 32 rotate together with each other.

As shown in FIG. 7, in the comparative example, the magnitude of fluctuations in angular acceleration rapidly increases when the revolution speed of the engine exceeds 4,000 rpm. The reason for this is as follows: due to torsional resonance of the crankshaft 20, rotational force is transmitted from the crankshaft 20 to the balance shafts 30 and 40 such that a sextic component of the fundamental frequency thereof is amplified, and the balancer apparatus resonates due to the sextic component.

In the present embodiment, on the other hand, almost no resonance phenomenon due to the sextic component occurs even when the balancer apparatus receives rotational force whose sextic component of the fundamental frequency is amplified. It follows that the transmission of the sextic component is surely blocked or prevented.

Figure 8:
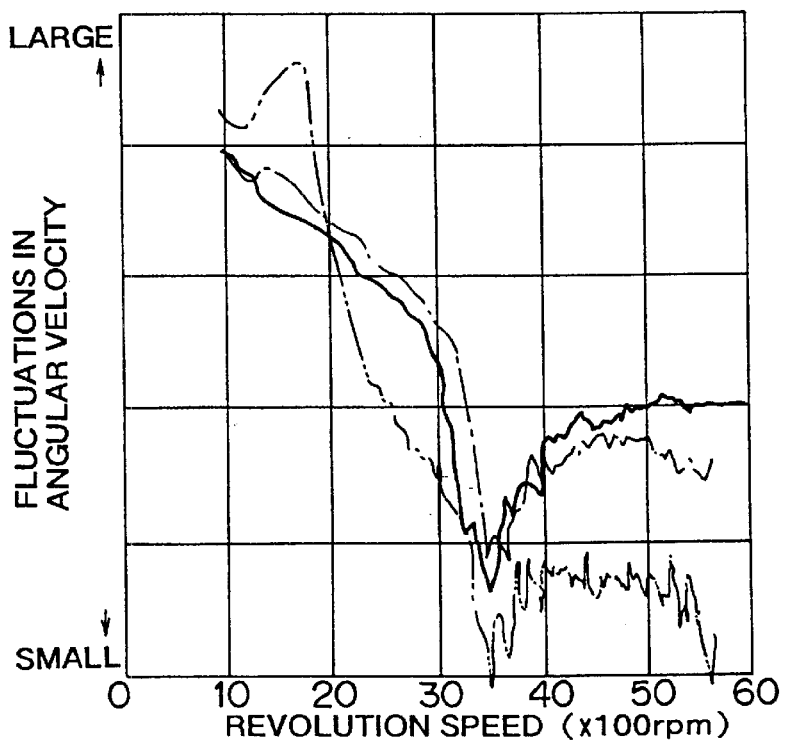
FIG. 8 is a graph showing a characteristic of fluctuations in the angular velocity of a balance shaft in relation to the speed of revolution of the internal combustion engine.

FIG. 8 is a graph showing experimental results regarding changes in fluctuations of the angular velocity of the first and second balance shafts 30 and 40 with respect to the speed of revolution of the internal combustion engine. In FIG. 8, the vertical axis indicates the fluctuations in the angular velocity in logarithm.

In FIG. 8, the solid line indicates a characteristic of the present embodiment in which the predetermined rotational angle θmax is set to "16°," and the one-dot chain line indicates a characteristic of a first comparative example in which the rotational angle θmax is set to "8°." The two-dot chain line of FIG. 8 indicates a characteristic of a second comparative example in which the rotational angle θmax is set to "0°." Namely, in the second comparative example, opposite end faces of each projection 56 as viewed in the circumferential direction abut on the corresponding end faces of the adjacent stopper rubbers 55 in an unloaded state.

It will be under stood from FIG. 8 that, in the second comparative example, there is a speed region within the range from 1,000 rpm to 2,000 rpm of the revolution speed of the engine, in which region the magnitude of fluctuations in the angular velocity rapidly increases. This is because a secondary component of the fundamental frequency of the rotational force transmitted from the crankshaft 20 to the balance shafts 30 and 40 causes resonance in the balancer apparatus.

In contrast, in the first comparative example, there is a region within the range from 1,000 rpm to 2,000 rpm in which the magnitude of fluctuations in the angular velocity slightly increases, but the amount of the increase thereof is much smaller than that of the second comparative example.

The reason for this is as follows: since the rotational angle θmax is set to be larger than "0°," the natural frequency of a vibration system formed by the balancer apparatus is reduced, whereby the resonance phenomenon due to the secondary component can be suppressed in the normal revolution speed range of the engine (>1,000 rpm). Another reason is that large damping force is applied to the vibration system because of the frictional force that is generated at the friction dampers 54 as the first driven gear 31 and the counter gear 32 rotate relative to each other in the rotational phase range or angle θmax.

In the present embodiment in which the rotational angle θmax is set to "16°", vibration-suppressing effects obtained by setting the rotational angle θmax to be larger than "0°" and by using the friction dampers 54 are further enhanced. In other words, while the revolution speed of the engine is in the range from 1,000 rpm to 2,000 rpm, the magnitude of fluctuations in the angular velocity does not increase and the above-described resonance phenomenon does not occur. The inventors have confirmed in a further detailed experiment that the resonance phenomenon caused by the secondary component can be suppressed by setting the rotational angle θmax to "1°" or larger.

Figure 9:
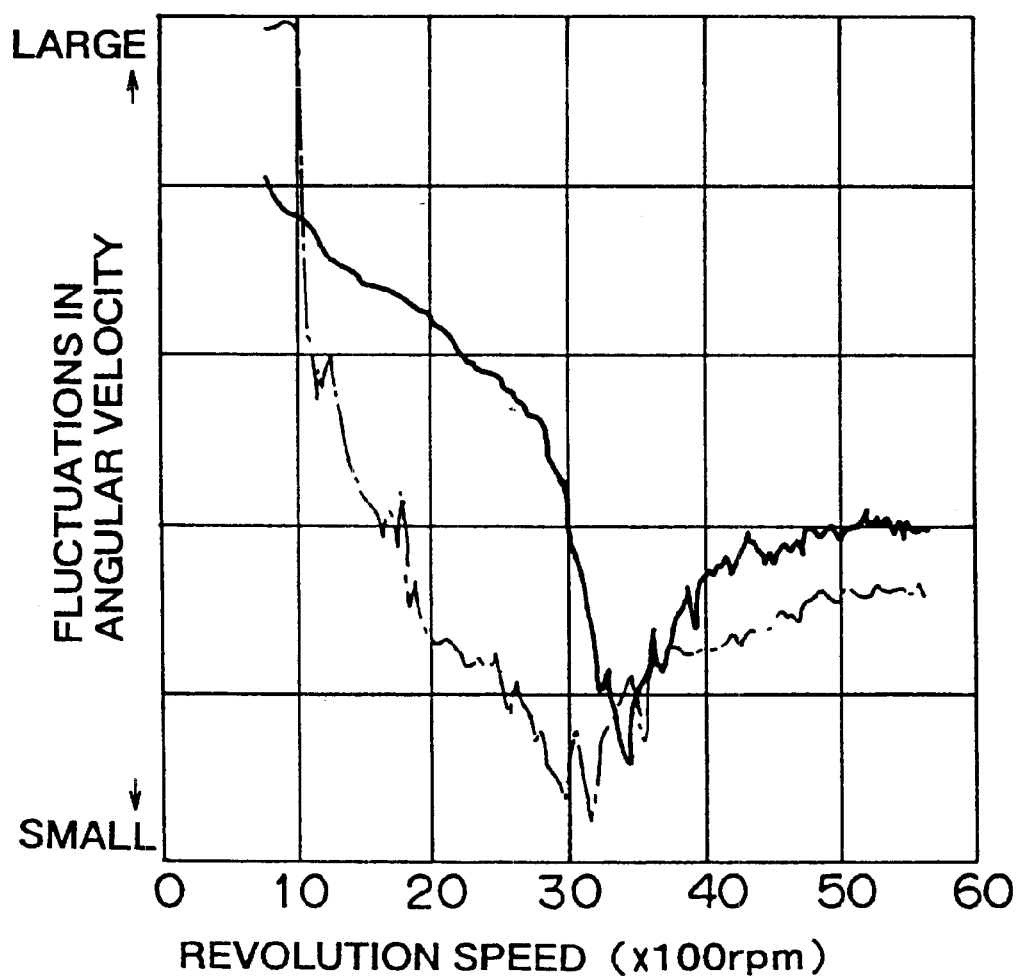
FIG. 9 is a graph showing a characteristic of fluctuations in the angular velocity of a balance shaft in relation to the speed of revolution of the internal combustion engine.

FIG. 9 shows results of an experiment conducted to confirm the vibration-suppressing effect by the frictional force of the friction dampers 54. Like FIG. 8, FIG. 9 is a graph showing changes in the magnitude of fluctuations in the angular velocity of the first and second balance shafts 30 and 40 with respect to the revolution speed of the internal combustion engine. In FIG. 9, the vertical axis represents fluctuations in the angular velocity in logarithm.

FIG. 9, the solid line indicates a characteristic of the present embodiment, and the one-dot chain line indicates a characteristic of a comparative example. In the comparative example, the friction dampers 54 are omitted, and the radially inner portion 31a of the first driven gear 31 is supported on the first balance shaft 30 so as to be rotatable relative to the first balance shaft 30.

As shown in FIG. 9, in the comparative example having no friction damper 54, the magnitude of fluctuations in the angular velocity abruptly reaches a peak when the revolution speed of the engine is in the neighborhood of 1,000 rpm. Namely, even if the rotational angle θmax is set to be larger than "0°," an effect of suppressing the resonance phenomenon due to the secondary component can no longer be obtained unless the damping force of an appropriate magnitude such as the frictional force of the friction dampers 54 is applied when the first drive gear 31 and the counter gear 32 rotate relative to each other within the rotational phase range or angle θmax.

It will be apparent from the above experimental results that, in the present embodiment, occurrence of the resonance phenomenon due to the secondary and sextic components can be surely suppressed by setting the rotational angle θmax to "1°" or larger, and generating the frictional force of the friction dampers 54 as damping force when the first driven gear 31 and the counter gear 32 rotate relative to each other within that rotational phase range or angle θmax. As a result, the spring constant of the stopper rubbers 55 can be set to be relatively large, and therefore each stopper rubber 55 is prevented from undergoing excessive deformation that would cause a damage thereof.

As specifically described above, the gear mechanism of the present embodiment provides the following effects or advantages.

(1) Where the rotational force transmitted from the crankshaft 20 to the balance shafts 30 and 40 includes both a low-frequency component (secondary component) and a high-frequency component (sextic component) as vibration components, the resonance phenomenon due to the components can be favorably suppressed without causing any damage or functional deterioration of the damping mechanism 50.

(2) Since the frictional force generated at the friction dampers 54 acts as the damping force of the damping mechanism 50, the damping force can be kept approximately constant without significantly changing depending on the speed of relative rotation between the first driven gear 31 and the first balance shaft 30. Accordingly, the capability of damping the low-frequency component, such as the secondary component, as a vibration component of the rotational force can further be improved as compared with a structure that uses a so-called oil damper or the like as a damping member. Thus, occurrence of a resonance phenomenon due to the low-frequency component can be further advantageously suppressed or prevented.

(3) The first driven gear 31 and the second driven gear 41 are formed as resin gears whose teeth are formed of a resin, and are thus able to absorb impact that occurs at gear-meshing portions between the crank gear 21 and the first driven gear 31 and between the counter gear 32 and the second driven gear 41, resulting in reduction in meshing noise. Furthermore, the fluctuations in the rotational force transmitted between the gears, in particular, its high-frequency component, can be advantageously damped.

(4) With regard to the metal gears meshing with the resin gears (the driven gears 31 and 41), that is, in the crank gear 21 and the counter gear 32, the gear-meshing noise can be reduced even if the working accuracy of the tooth surfaces of the metal gears is somewhat low. It is thus possible to eliminate some process steps, such as shaving and polishing the tooth surfaces of the metal gears, and backlash control by selection and adjustment of a shim commonly used for forming metal gears. Moreover, since the resin gears are respectively meshed with the metal gears, disadvantages such as thermal adhesion between the gears can be avoided.

(5) By forming the recesses 32a, 35a, 41a and 45a, the respective centers of gravity of the counter gear 32, the second driven gear 41 and the thrust bearings 35 and 45 are shifted away from the axes of the gears and bearings to be on the same side as that of the centers of gravity of the unbalance weights 33 and 43. Accordingly, the counter gear 32, the second driven gear 41 and the thrust bearings 35 and 45 perform substantially the same function as that of the unbalance weights 33 and 43, resulting in reduction in size and weight of the unbalance weights 33 and 43.

(6) The centers of gravity of the counter gear 32, the second driven gear 41 and the thrust bearings 35 and 45 are respectively offset from the central axes of the balance shaft 30 and 40. Therefore, the balance shafts 30 and 40 are subjected to the centrifugal force at their portions supported by the respective first radial bearings 15. Accordingly, the balance shafts 30 and 40 rotate with the supported portions thereof being pressed against the respective inner circumferential surfaces of the first radial bearings 15 by the centrifugal force. As a result, irregular or non-uniform vibration at the supported portions is suppressed, whereby contact noise generated between each of the portions and the inner circumferential surface of the corresponding first radial bearing 15 can be reduced.

(7) The number of teeth 31c of the first driven gear 31 is set to be an integral multiple of the number of stopper rubbers 55. Therefore, the degree of freedom in meshing the crank gear 21 with the first driven gear 31 and assembling the first driven gear 31 with the counter gear 32, or the first balance shaft 30, via the damping mechanism 50, is increased. Thus, the gear mechanism of the present embodiment can be assembled together with an improved efficiency.

(8) The resin gears (the first driven gear 31 and the second driven gear 41) are formed of a thermosetting resin, such as polyamino amide or phenol, that is reinforced by aramid-fiber fabric. The resin gears thus formed exhibits excellent durability.

(9) The vibration of the first driven gear 31 in the axial direction of the first balance shaft 30 is damped by the frictional force of the friction dampers 54, resulting in reduction or suppression of noise caused by the vibration.

Figure 24:
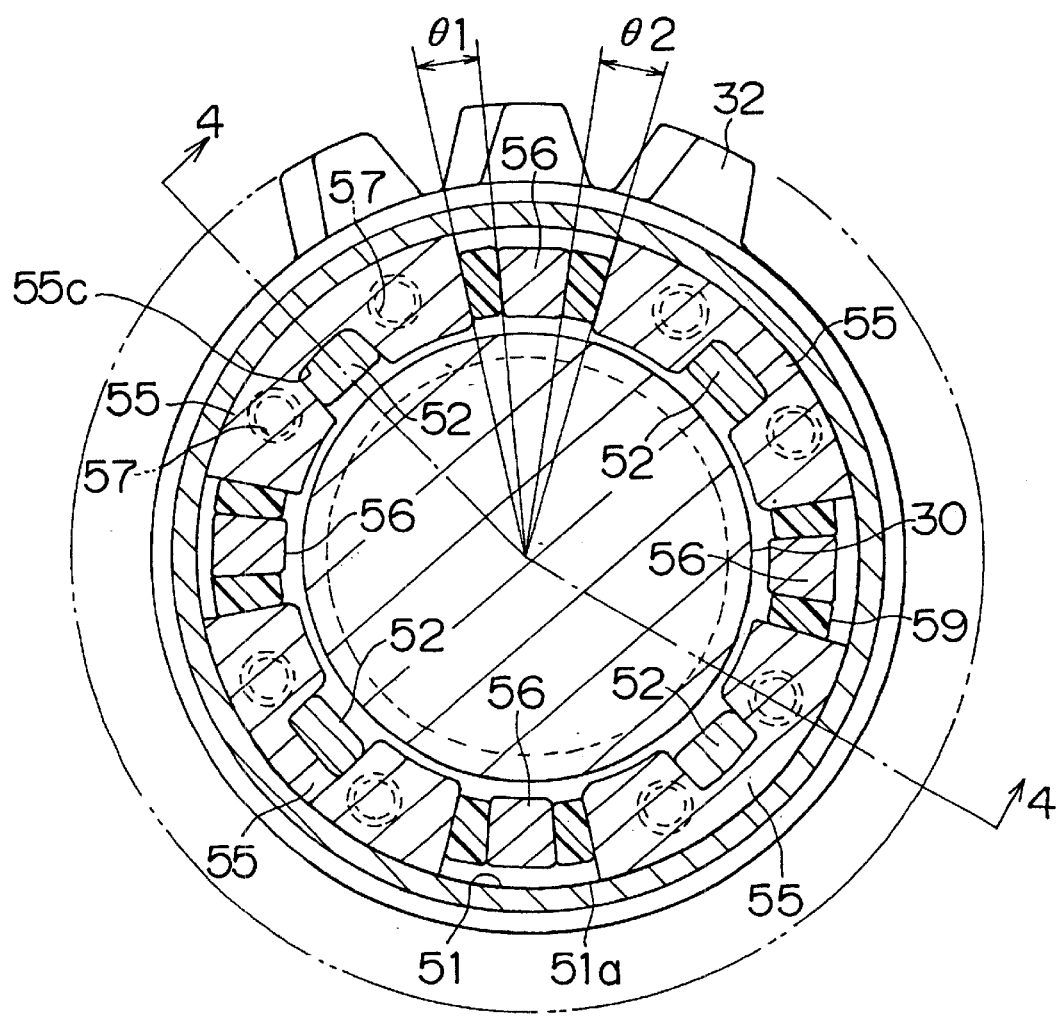
FIG. 24 is a cross-sectional view showing a damping mechanism of a gear mechanism as a modified example of the first embodiment of the present invention.
Figure 25:
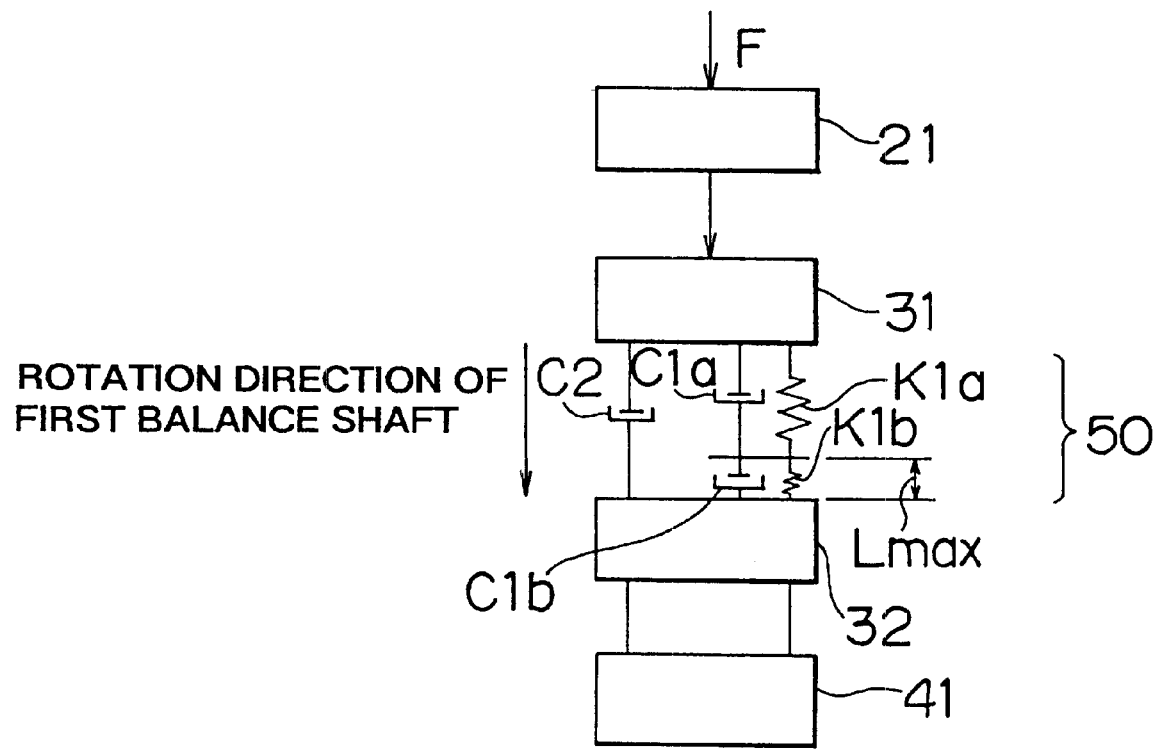
FIG. 25 is a diagram modelling the gear mechanism of the modified example of FIG. 24.

FIG. 24 and FIG. 25 show a modified example of the first embodiment in which elastic bodies 59, such as rubber dampers or metallic springs, having extremely small spring constant and damping coefficient are interposed between corresponding end faces of the stopper rubbers 54 and projections 56. Namely, the elastic bodies 59 substantially fill clearances L (corresponding to the above angles θ1, θ2) between the stopper rubbers 54 and the projections 56. Where K1a and C1a represent the spring constant and damping coefficient of the stopper rubbers 55, and K1b and C1b represent the spring constant and damping coefficient of the elastic bodies 59, as shown in FIG. 25, K1b and C1b are set significantly smaller than K1a and C1a, respectively. With this arrangement, too, the resonance of the damping mechanism due to the secondary vibration of the engine may be suppressed in the normal revolution speed range of the engine, as in the case where the rotational angle θmax is set to be larger than 0". In addition, the above arrangement may facilitate assembling of the driven gear 31 and counter gear 32 with the damping mechanism 50 since the positions of the gears are automatically determined in the presence of the elastic bodies 59. Furthermore, when the damping mechanism 50 of the modified example is mounted on a balance shaft, variations or shifts in the phase of the unbalance weights on the balance shaft may be eliminated, and therefore the secondary vibration of the engine may be effectively suppressed.

Hereinafter, other embodiments of the present invention will be described. As in the first embodiment, each of the following embodiments is also applied to a balancer apparatus of a four-cylinder internal combustion engine, and the basic structure thereof is the same as that shown in FIGS. 1, 2 and 5. In the following, the difference between each embodiment and the first embodiment will be mainly described. The same elements as those described in the first embodiment are denoted by the same reference numerals and characters, and description thereof will not be provided.

Second Embodiment

Figure 10:
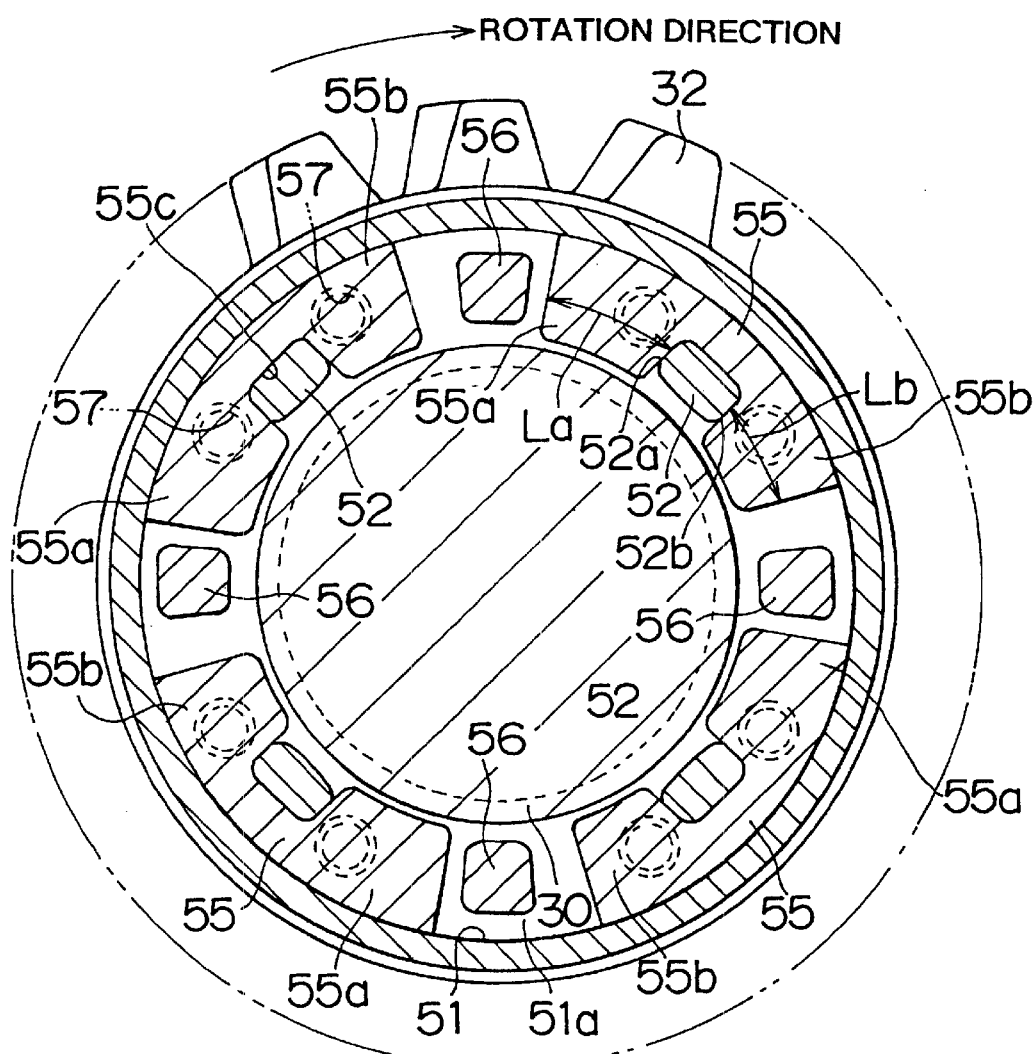
FIG. 10 is a cross-sectional view showing the construction of a damping mechanism in a gear mechanism according to the second embodiment of the present invention.

First, a gear mechanism according to the second embodiment of the present invention will be described. FIG. 10 shows a specific construction of the gear mechanism according to the second embodiment As shown in FIG. 10, the second embodiment is different from the first embodiment in that a portion 55a of each stopper rubber 55 that extends from one side surface 52a of the corresponding engaging projection 52 in the direction opposite to the direction of rotation of the counter gear 32 (hereinafter, such a portion 55a will be referred to as "acceleration-side portion 55a") has a length different from that of a portion 55b of each stopper rubber 55 that extends from the other side surface 52b of the corresponding engaging projection 52 in the direction of rotation of the counter gear 32 (hereinafter, such a portion 55b is referred to as "deceleration-side portion 55b").

The deceleration-side portion 55b is a portion on which the corresponding projection 56 abuts when the rotational force transmitted from the crankshaft 20 decreases mainly during deceleration of the engine. In contrast, the acceleration-side portion 55a is a portion on which the corresponding projection 56 abuts when the rotational force transmitted from the crankshaft 20 increases mainly during acceleration of the engine. More specifically, the acceleration-side portion 55a is a portion on which the corresponding projection 56 abuts not only during acceleration of the engine but also during a steady-state operation of the engine, i.e., when approximately constant rotational force is transmitted. Accordingly, the acceleration-side portions 55a are more frequently subjected to elastic deformation and are likely to undergo a larger amount of deformation, as compared with the deceleration-side portions 55b. Accordingly, the acceleration-side portions 55a is required to be more durable than the deceleration-side portions 55b.

Thus, in the present embodiment, the length Lb of the deceleration-side portion 55b is reduced, and the length La of the acceleration-side portion 55a is increased by an amount of reduction in the length Lb, so that the lengths La and Lb of the portions 55a and 55b have a relationship of La>Lb. As a result, the volume of the acceleration-side portion 55a is larger than that of the deceleration-side portion 55b, whereby the elastic deformation limit, i.e., the maximum permissible amount of elastic deformation, of the acceleration-side portion 55a is larger than that of the deceleration-side portion 55b.

Accordingly, the acceleration-side portions 55a can effectively alleviate and absorb impact that acts on these portions 55a, and are allowed to elastically deform to a great extent without incurring any damage thereof even when the rotational force from the crankshaft 20 is rapidly increased.

On the other hand, since the deceleration-side portions 55b are less frequently subjected to elastic deformation and have a less amount of deformation as compared with the acceleration-side portions 55a, the length Lb of the deceleration-side portions 55b is set to be short. Therefore, the volume of the stopper rubber 55 is not unnecessarily increased as a result of increasing the length La of the acceleration-side portion 55a.

Thus, according to the present embodiment, the following effects can be obtained in addition to the effects (1) to (9) as described in the first embodiment.

(10) Since the acceleration-side portions 55a of the stopper rubbers 55 are allowed to elastically deform to a greater extent, the durability of the stopper rubbers 55 can be improved.

(11) Since the volume of the stopper rubber 55 is not increased to be larger than required, the rotational angle θmax can be kept large enough to maintain the desired damping capability of the damping mechanism 50.

Third Embodiment

Hereinafter, a gear mechanism according to the third embodiment of the present invention will be described. The third embodiment is different from the first embodiment in the point as follows. In the first embodiment, the first driven gear 31 and the crank gear 21 have the same tooth width, and the counter gear 32 and the second driven gear 41 have the same tooth width. In the third embodiment, however, the resin gears such as the first driven gear 31 and the second driven gear 41 have a tooth width different from that of the metal gears such as the crank gear 21 and the counter gear 32 that mesh with the resin gears.

In general, the maximum rotational force transmitted between a pair of gears meshing with each other is obtained, and the tooth width of each of the gears is set so that the teeth will not be broken or damaged when they receive the maximum rotational force. In the case where a metal gear is meshed with a resin gear, therefore, the tooth width of the metal gear is determined in accordance with the tooth width of the resin gear having a lower tooth strength.

Figure 11A:
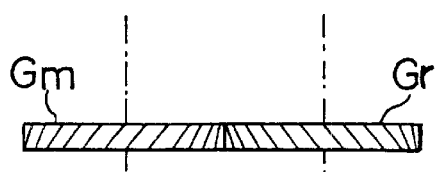
FIGS. 11A, 11B and 11C are schematic diagrams illustrating the meshing or engaging states of a resin gear and a metal gear.
Figure 11B:
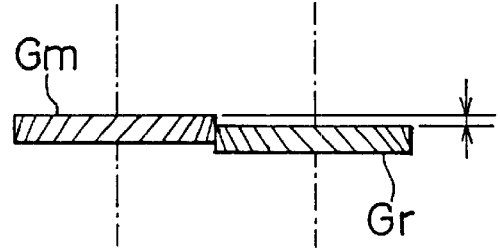
Figure 11C:
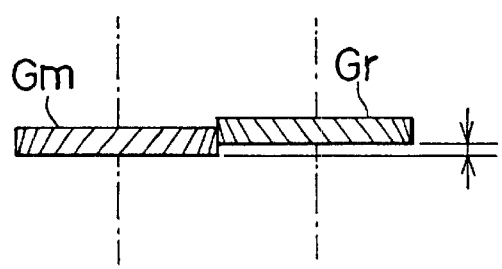

As shown in FIG. 11A, it would be desirable if a resin gear Gr and a metal gear Gm mesh with each other in an accurately aligned manner in the tooth-width direction of the gears. However, as shown in FIG. 11B or 11C, the resin gear Gr may actually mesh with the metal gear Gm with the teeth of the gear Gr being displaced from those of the gear Gm in the direction of their rotation axes.

Such displacement may be caused by an error in mounting the gears, vibration during rotation, and the like. Moreover, in the case where the resin gear and the metal gear are formed as helical gears, thrusts are applied in different directions to the respective gears during rotation thereof, and the gears may be displaced or offset from each other to a significant extent.

Such displacement in the tooth-width direction causes abutment between only local portions of the metal gear and the resin gear. In such a case, a contact area between the respective teeth of the resin gear and the metal gear is accordingly reduced, whereby a contact pressure is increased. Accordingly, the resin gear having the lower wear resistance and durability than the metal gear may be increasingly worn or damaged.

In the present embodiment, therefore, the first driven gear 31 (resin gear) meshing with the crank gear 21 (metal gear) has a larger tooth width than that of the crank gear 21. Similarly, the second driven gear 41 (resin gear) also has a larger tooth width than that of the counter gear 32 (metal gear).

By setting the respective tooth widths of the driven gears 31 and 41 in the above manner, local abutment between the gears is avoided, and an otherwise possible increase in the contact pressure at the teeth of the drive gears 31, 41 can be prevented even if the gears are displaced or offset in the tooth-width direction.

Figure 12:
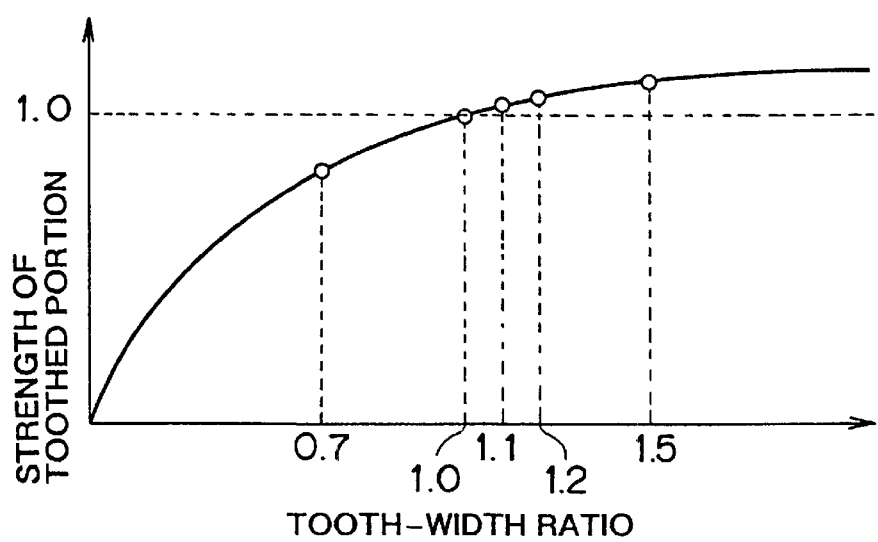
FIG. 12 is a graph showing the relationship between the ratio of the tooth width of the resin gear to the tooth width of the metal gear and the strength of a toothed portion of the resin gear.

FIG. 12 shows an experimental result regarding changes in the strength of a toothed portion of a resin gear meshing with a metal gear when the tooth width Br of the resin gear is changed while the tooth width Bm of the metal gear is kept constant.

In FIG. 12, the horizontal axis indicates ratio Br/Bm (tooth-width ratio) of the tooth width Br of the resin gear to the tooth width Bm of the metal gear, and the vertical axis indicates the strength of the toothed portion of the resin gear. In FIG. 12, the strength of the toothed portion is represented as a relative value to a reference value "1.0" that is the strength when the tooth-width ratio Br/Bm is equal to "1.0."

It will be understood from FIG. 12 that the strength of the toothed portion can be increased by setting the tooth-width ratio Br/Bm to be higher than "1.0." In order to surely increase the strength of the toothed portion of the resin gear, it is desirable to set the tooth-width ratio Br/Bm to "1.1" or larger. However, the strength of the toothed portion is hardly increased once the tooth-width ratio Br/Bm exceeds "1.5." Therefore, in order to prevent an increased size of the resin gear, it is desirable to set the tooth-width ratio Br/Bm to "1.5" or smaller.

In the present embodiment, the tooth width of the first driven gear 31 is set to 1.1 times that of the crank gear 21, based on the relationship between the tooth-width ratio Br/Bm and the strength of the toothed portion of the resin gear. Similarly, the tooth width of the second driven gear 41 is also set to 1.1 times that of the counter gear 32.

According to the present embodiment as described above, the following effect can be obtained in addition to the effects (1) to (9) as described in the first embodiment.

(12) Even if the tooth positions of the first driven gear 31 and the crank gear 21 or the tooth positions of the second driven gear 41 and the counter gear 32 are displaced or shifted in the tooth-width direction, such displacement will not cause abutment of local portions of these gears 31 and 21 (or 41 and 32). Accordingly, the driven gears 31 and 41 do not suffer from wear due to the local abutment as described above, and are also free from damage and breakage.

Fourth Embodiment

Hereinafter, a gear mechanism according to the fourth embodiment of the present invention will be described.

Although a resin gear whose strength of the toothed portion is lower than that of a metal gear is used as the first driven gear 31 and the second driven gear 41, in the first embodiment, each of the gears 31 and 41 ensures a sufficiently high degree of durability since the damping mechanism 50 as described above favorably prevents the resonance from occurring in the gears. However, if the shift position is inappropriately changed on the transmission side of the engine, for example, excessive rotational force that is not supposed to be received may be transmitted from the crankshaft 20 to the balance shafts 30 and 40, whereby the teeth of the driven gears 31 and 41 may be broken. If the teeth of the driven gears 31 and 41 are broken, biting may occur between the crank gear 21 and the first driven gear 31 and between the counter gear 32 and the second driven gear 41. Such biting may cause excessive impact force to be applied to the crankshaft 20 or other members that rotate therewith, thereby possibly damaging the crankshaft 20 and other members.

In the present embodiment, when excessively large rotational force is transmitted from the crankshaft 20 to the balance apparatus, the rotational force from the crankshaft 20 is forcibly cut off or blocked.

More specifically, in the gear mechanism of the present embodiment, the breakage strength as measured upon breakage (fracture) of each of the projections 56 due to the elastic force of the stopper rubbers 55 is set to be smaller than the strength of the toothed portion of the first driven gear 31.

Figure 13A:
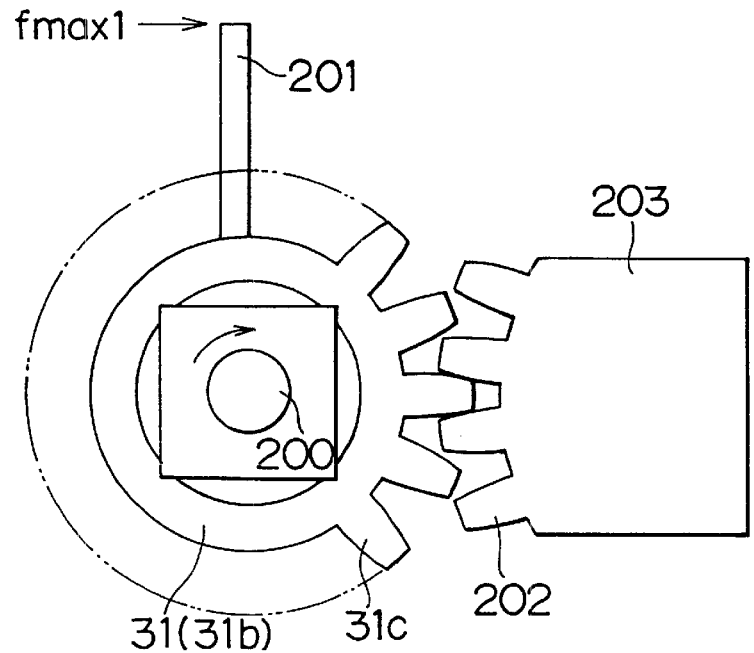
FIGS. 13A and 13B are diagrams illustrating the manner of measuring the strength of the toothed portion of the resin gear and the manner of measuring the breakage strength of each projection provided in the resin gear, respectively.
Figure 13B:
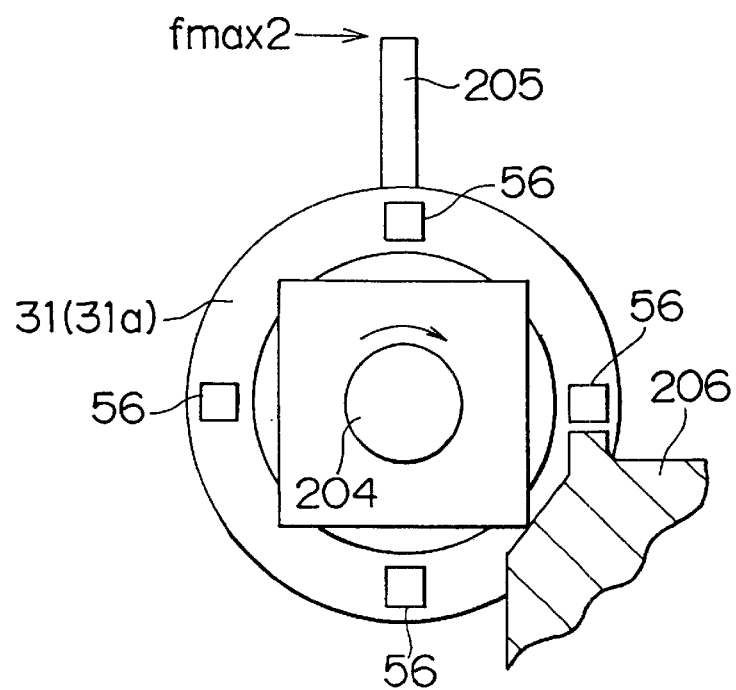

FIG. 13A is a schematic view illustrating the manner of measuring the strength of the toothed portion of the first driven gear 31. FIG. 13B is a schematic view illustrating the manner of measuring the breakage strength of each projection 56.

As shown in FIG. 13A, upon measuring the strength of the toothed portion of the first driven gear 31, the first driven gear 31 (the radially outer portion 31b) is first fixed to a rotary shaft 200, and a lever 201 is also fixed to the rotary shaft 200. Moreover, a stationary toothed piece 203 whose teeth 202 have the same shape as those of the crank gear 21 is meshed with the first driven gear 31. Then, a load is applied to an end portion of the lever 102 in the direction of rotation thereof, so that the teeth 31c of the first drive gear 31 engaging with the toothed piece 203 are broken, and the load "fmax1" applied at the time of the breakage is measured. The strength of the toothed portion of the first driven gear 31 is calculated as torque T1 (=fmax1·L1) that is obtained by multiplying the load "fmax1" by a length (or distance from the central axis of the rotary shaft 200 to the point that is subjected to the load) L1 of the lever 201.

To measure the breakage strength of the projections 56, on the other hand, the first driven gear 31 (the radially inner portion 31a) is first fixed to a rotary shaft 204, and a lever 205 is also fixed to the rotary shaft 204, as shown in FIG. 13B. Moreover, movement of one projection 56 in the rotation direction is limited by a stationary jig 206. Then, a load is applied to an end portion of the lever 205 in the direction of rotation thereof, so that the projection 56 is broken, and the load "fmax2" applied at the time of breakage is measured. The breakage strength of the projection 56 is calculated as torque T2 (=fmax2·L2·n) that is obtained by multiplying the load "fmax2" by a length L2 of the lever 205 and the number of projections 56 "n" (n=4 in the present embodiment).

Thus, design values for defining the strength of the first driven gear 31 and the projections, for example, the shapes of the teeth 31c and the projections 56, are suitably determined so that the strength T1 of the toothed portion of the first drive gear 31 and the breakage strength T2 of the projections 56 have a relationship of T2<T1. Also, the strength of the toothed portion of the second driven gear 41 is set so that the second driven gear 41 has the same strength as that of the first driven gear 31.

In the gear mechanism of the present embodiment as described above, even if such excessive rotational force that would break the teeth of the driven gears 31 and 41 is transmitted from the crankshaft 20 to the balance shafts 30 and 40, the projections 56 are broken before breakage of the gear teeth, whereby mechanical coupling between the first driven gear 31 and the counter gear 32 is forcibly cut off or eliminated. As a result, the first driven gear 31 is no longer subjected to the inertial force of the balance shafts 30 and 40 that is equal to or larger than the frictional force of the friction dampers 54. Accordingly, breakage of the first driven gear 31 can be surely avoided.

Similarly, the rotational force of the crankshaft 20 that is equal to or larger than the frictional force of the friction dampers 54 is not transmitted to the second driven gear 41. Therefore, breakage of the second driven gear 41 can also be surely avoided.

In the present embodiment as described above, the following effect can be obtained in addition to the effects (1) to (9) as described in the first embodiment.

(13) Breakage of the toothed portions of the first and second driven gears 31 and 41 is avoided even when the excessive rotational force is received, and biting that would otherwise occur at gear meshing portions including the first and second driven gears 31 and 41, and any problem caused by the biting, can be prevented in advance.

Fifth Embodiment

Figure 14:
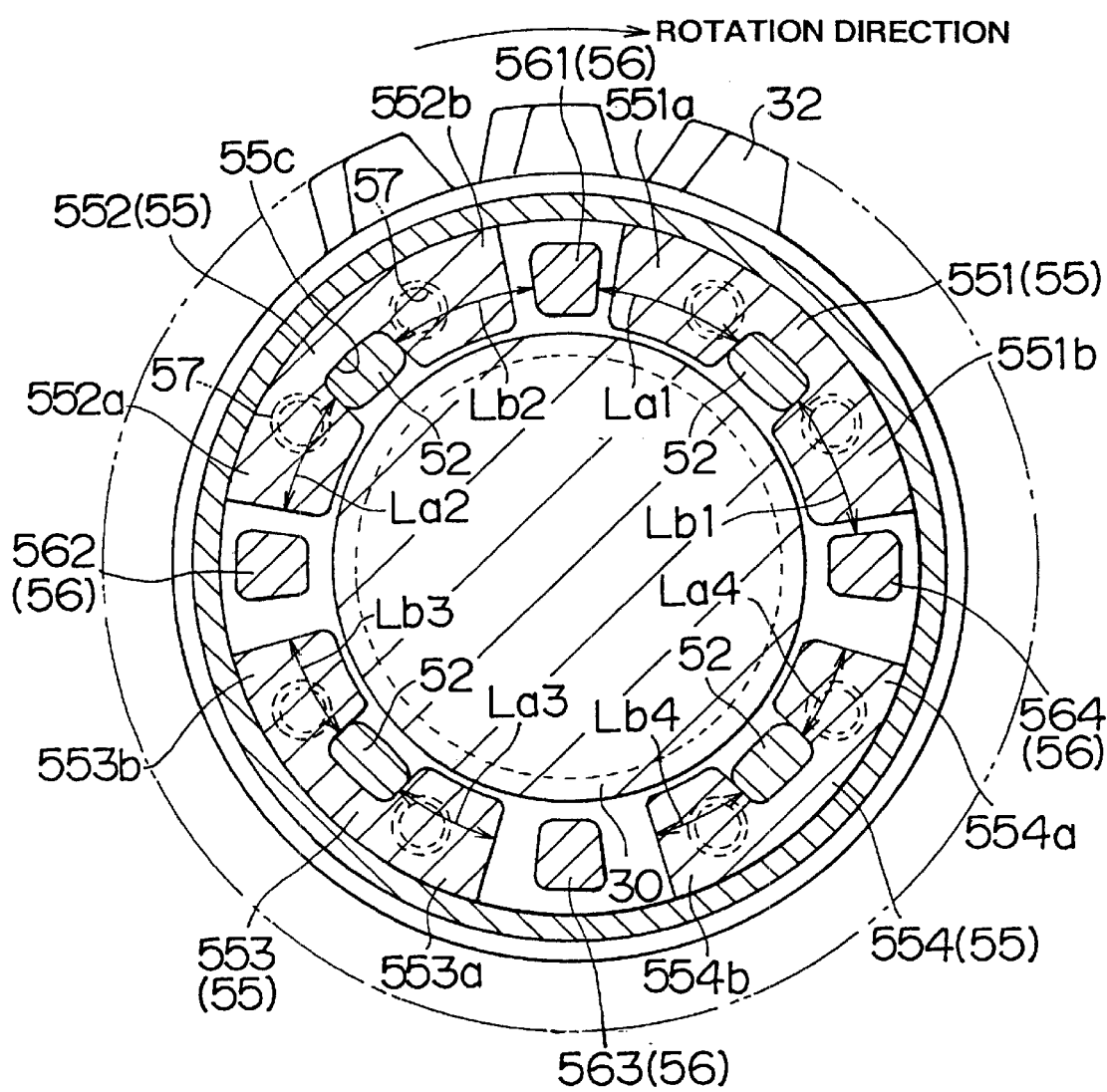
FIG. 14 is a cross-sectional view showing the construction of a damping mechanism in a gear mechanism according to the fifth embodiment of the present invention.

Hereinafter, a gear mechanism according to the fifth embodiment of the present invention will be described. FIG. 14 shows a specific structure of the gear mechanism of the fifth embodiment. In the following description, the stopper rubbers 55 are sequentially identified as a first stopper rubber 551, a second stopper rubber 552, a third stopper rubber 553, and a fourth stopper rubber 554 in the circumferential direction of the counter gear 32.

One of the projections 56 that is located between an acceleration-side portion 551a of the first stopper rubber 551 and a deceleration-side portion 552b of the second stopper rubber 552 is identified as a first projection 561. The remaining projections 56 are sequentially identified as a second projection 562, a third projection 563, and a fourth projection 564 in the circumferential direction of the counter gear 32.

As shown in FIG. 14, in the present embodiment, respective circumferential lengths La1, La2, La3 and La4 of the acceleration-side portions 551a to 554a of the stopper rubbers 551 to 554 are set to be different from each other. Similarly, respective circumferential lengths Lb1, Lb2, Lb3 and Lb4 of the deceleration-side portions 551b to 554b are set to be different from each other. As a result, in the present embodiment, the projections 561 to 564 abut on the respective stopper rubbers 551 to 554 with different amounts of relative rotation between the first driven gear 31 and the counter gear 32.

More specifically, the lengths La1 to La4 of the acceleration-side portions 551a to 554a and the lengths Lb1 to Lb4 of the deceleration-side portions 551b to 554b of the stopper rubbers 551 to 554 are set to have the following relationship:

$$La1 > La2 > La3 > La4 \quad (2)$$

$$Lb1 > Lb2 > Lb3 > Lb4 \quad (3)$$

When the first driven gear 31 rotates relative to the counter gear 32 in the same direction as that of rotation of the counter gear 32 while none of the projections 561 to 564 is abutting on the corresponding stopper rubbers 551, 554, as shown in FIG. 14, the first projection 561 initially abuts on the acceleration-side portion 551a of the first stopper rubber 551. As the first driven gear 31 further rotates relative to the counter gear 32, the second projection 562 abuts on the acceleration-side portion 552a of the second stopper rubber 552. As the first driven gear 31 still further rotates relative to the counter gear 32, the third projection 563 abuts on the acceleration-side portion 553a of the third stopper rubber 553, and finally, the fourth projection 564 abuts on the acceleration-side portion 554a of the fourth stopper rubber 554.

Similarly, when the first driven gear 31 rotates relative to the counter gear 32 in the direction opposite to that of rotation of the counter gear 32 while none of the projections 561 to 564 is abutting on the corresponding stopper rubbers 551, 554, the fourth projection 564 initially abuts on the deceleration-side portion 551b of the first stopper rubber 551. As the first driven gear 31 further rotates relative to the counter gear 32, the first projection 561 abuts on the deceleration-side portion 552b of the second stopper rubber 552. As the first driven gear 31 still further rotates relative to the counter gear 32, the second projection 562 abuts on the deceleration-side portion 553b of the third stopper rubber 553, and finally, the third projection 563 abuts on the deceleration-side portion 554b of the fourth stopper rubber 554.

Accordingly, in the gear mechanism of the present embodiment, the overall spring constant of the stopper rubbers 551 to 554 changes in four stages or steps depending upon the amount of relative rotation between the first driven gear 31 and the counter gear 32. Therefore, the stopper rubbers 551 to 554 have a more non-linear spring characteristic. As a result, the natural frequency of the vibration system formed by the balancer apparatus is diversified into at least four frequencies, and therefore the damping capability of the damping mechanism 50 can be further enhanced. Moreover, since the projections 561 to 564 abut on the respective stopper rubbers 551 to 554 at different times, noise and vibration caused upon contact therebetween are alleviated.

According to the present embodiment as described above, the following effects can be obtained in addition to the effects (1) to (9) as described in the first embodiment.

(14) The resonance phenomenon is not likely to occur at the natural frequency of the vibration system formed by the balancer apparatus. Thus, occurrence of the resonance phenomenon can be favorably prevented.

(15) Noise and vibration that would occur upon abutment of the projections 561 to 564 on the respective stopper rubbers 551 to 554 can be alleviated and thus reduced.

Sixth Embodiment

Figure 15:
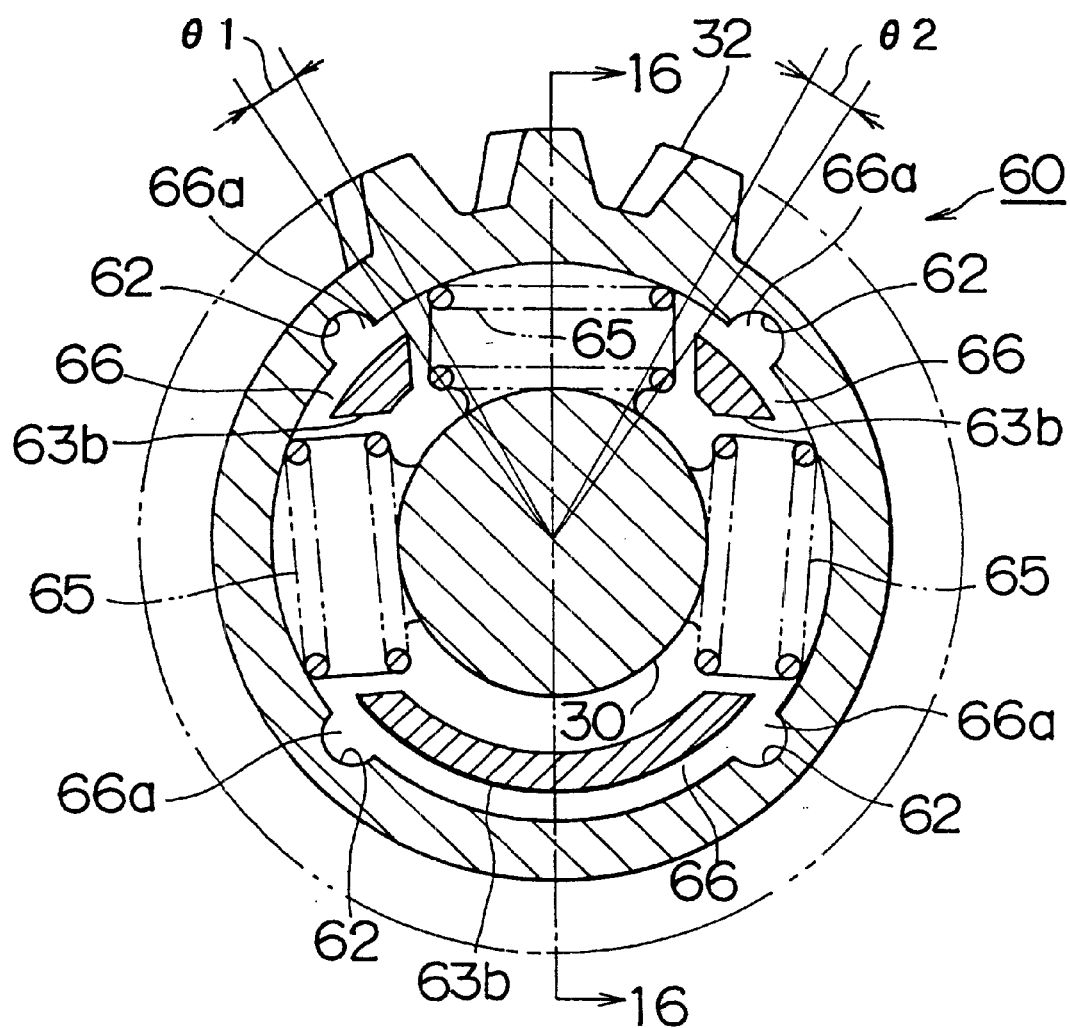
FIG. 15 is a cross-sectional view showing the construction of a damping mechanism in a gear mechanism according to the sixth embodiment of the present invention.
Figure 16:
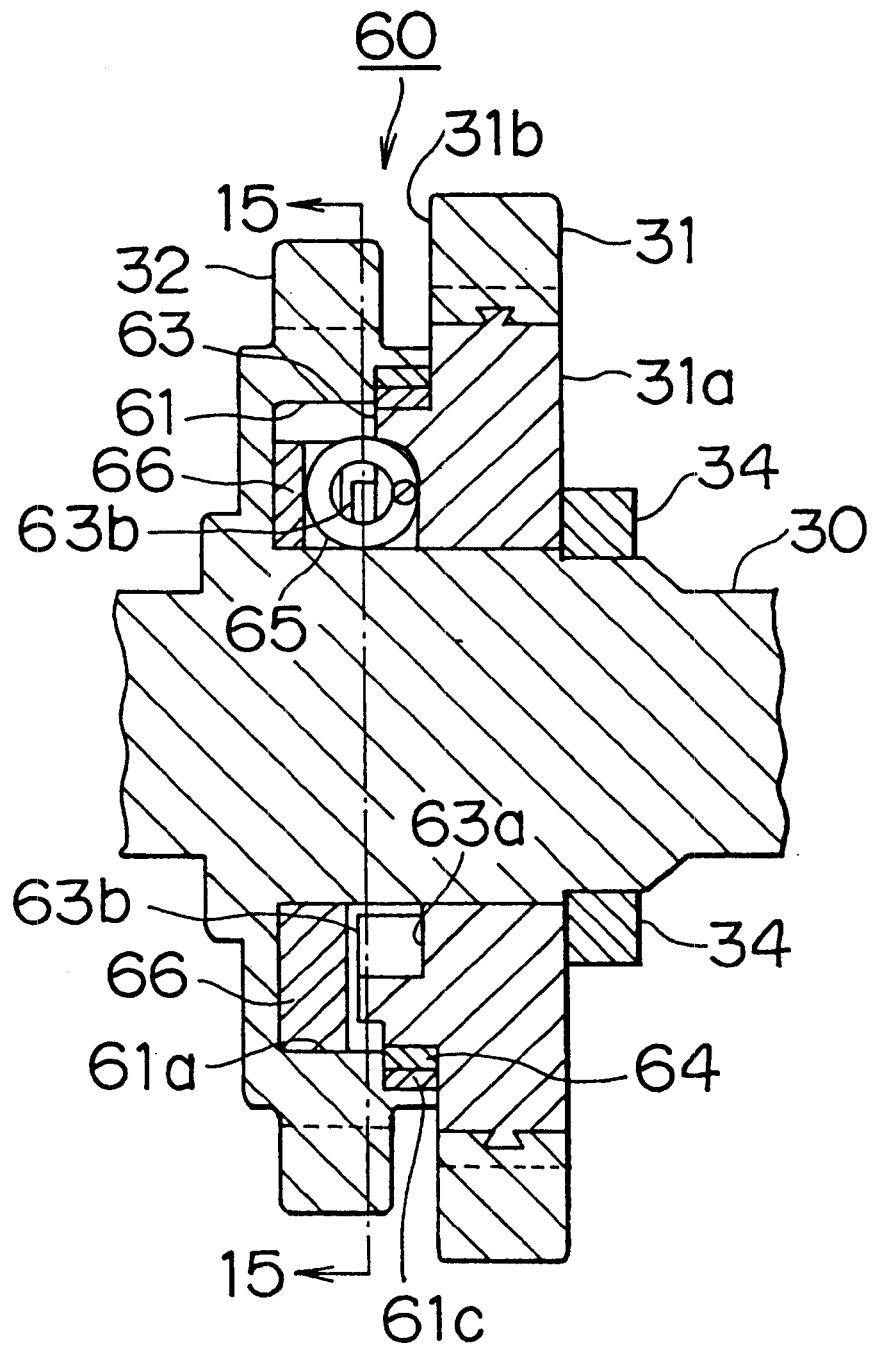
FIG. 16 is a cross-sectional view taken along line 16—16 of FIG. 15.

Hereinafter, a gear mechanism according to the sixth embodiment of the present invention will be described. FIGS. 15 and 16 show a specific structure of the gear mechanism according to the sixth embodiment. The sixth embodiment is different from the first embodiment only in the structure of the damping mechanism 50.

More specifically, in the sixth embodiment, a damping structure 60 constructed as described below is disposed between the first driven gear 31 and the counter gear 32, as shown in FIGS. 15 and 16. FIG. 15 is a cross-sectional view taken along line 15—15 of FIG. 16, and FIG. 16 is a cross-sectional view taken along line 16—16 of FIG. 15.

As shown in FIG. 16, the radially inner portion 31a of the first driven gear 31 has a projection 63 formed on the side facing the counter gear 32. The projection 63 has a recess 63a formed concentrically with the first balance shaft 30. A plurality of projections 63b (three projections 63b in this example) projecting further toward the counter gear 32 are formed on the top face of the projection 63. A ring 34 engages with the first balance shaft 30, to be located on the side of the first driven gear 31 with respect to the counter gear 32. The ring 34 serves to limit axial movement of the first driven gear 31.

The counter gear 32 has an annular recess 61 formed on the side facing the first driven gear 31. The annular recess 61 surrounds the outer periphery of the first balance shaft 30. With the first driven gear 31 engaging with the first balance shaft 30, an annular space is formed by the outer circumferential surface of the projection 63 and an inner wall surface 61c that defines the recess 61. An annular friction damper 64 serving as a damping member is disposed in this space. Like the friction damper 54 of the first embodiment, the friction damper 64 also includes a sliding portion formed of a metal, and an elastic portion formed of an elastic material such as a rubber material (both portions are not shown in the figures). The sliding portion abuts on the inner wall surface 61c of the recess 61, and the elastic portion abuts on the outer circumferential surface of the projection 63.

As shown in FIG. 15, a plurality of engaging grooves 62 (four engaging grooves 62 in this example) each having a semi-circular cross-section are formed at predetermined intervals in an inner wall surface 61a of the recess 61. These engaging grooves 62 are formed in the radial direction of the first balance shaft 30. A plurality of metal coil springs 65 (three coil springs 65 in this example) are disposed within a space formed by the recesses 61 and 63a. Moreover, a plurality of limiting members 66 (three limiting members 66 in this example) for limiting rotation of the respective coil springs 65 relative to the first balance shaft 30 as well as axial movement of the coil springs 65 are provided within the space.

Each limiting member 66 has an engaging portion 66a adapted for engaging with the corresponding engaging groove 62. By such engagement between the engaging portion 66a and the corresponding engaging groove 62, each limiting member 66 is fixed so as not to be rotatable relative to the counter gear 32. The limiting members 66 and the coil springs 65 are alternately disposed within the recess 61 such that opposite ends of each coil spring 65 abut on parts of the corresponding ends of the adjacent two limiting members 66, thereby preventing relative rotation of the coil springs 65.

Moreover, the projections 63b are provided around the central axis of the first balance shaft 30 such that each projection 63b is located between the adjacent coil springs 65 and is spaced apart from the opposed ends of the adjacent coil springs 65 by predetermined angles θ1 and θ2, respectively. The predetermined angles θ1 and θ2 are changed as the first driven gear 31 and the counter gear 32 rotate relative to each other. However, the sum of the predetermined angles (θ1+θ2) is a fixed value (θmax=θ1+θ2).

Therefore, in the present embodiment as well, the first driven gear 31 and the counter gear 32 can rotate relative to each other within a predetermined rotational phase range or angle (=θmax) that is equal to the sum of the predetermined angles θ1 and θ2 (=θ1+θ2), before each projection 63b abuts on either end of the adjacent coil springs 65. In other words, when the first driven gear 31 and the counter gear 32 rotate relative to each other beyond the predetermined rotational angle θmax, each projection 63b abuts on the end of the corresponding coil spring 65. In the present embodiment, the predetermined rotational angle θmax is set to "10°".

According to the structure of the present embodiment as described above, approximately the same effects as those of the first embodiment can be obtained.

It is to be understood that each of the illustrated embodiments may be modified when appropriate in the manners as described below by way of example.

The manner in which the friction dampers 54 and 64 are mounted is not limited to that described in each of the illustrated embodiments, but may be suitably modified as long as frictional force of an appropriate magnitude can be generated as the first balance shaft 30 and the first driven gear 31 rotate relative to each other.

Figure 17:
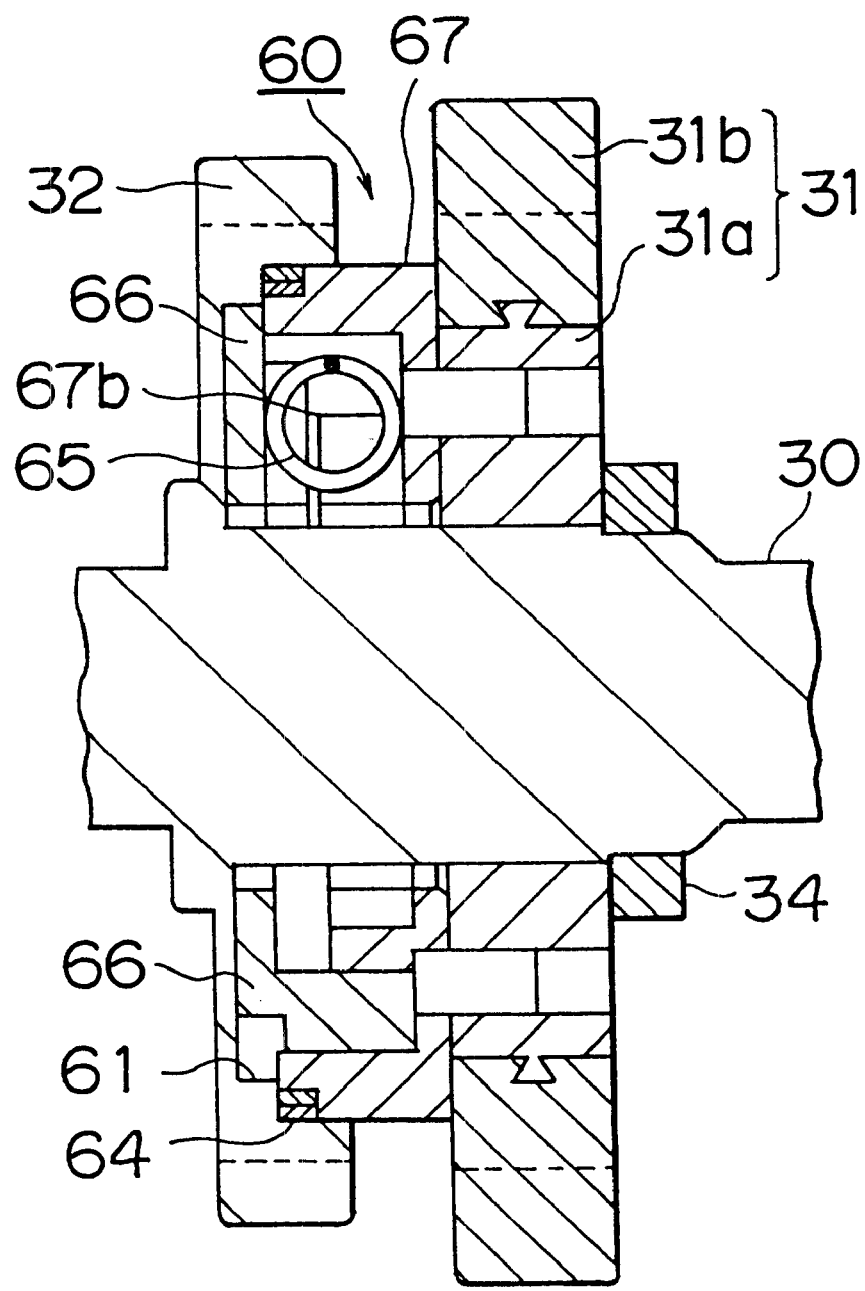
FIG. 17 is a cross-sectional view showing the construction of a damping mechanism in a modified example of the gear mechanism of the sixth embodiment.

In the sixth embodiment, the friction damper 64 is interposed between the outer circumferential surface of the projection 63 formed on the radially inner portion 31a of the first driven gear 31 and the inner wall surface of the recess 61 formed in the counter gear 32. It is, however, possible to modify the structure as shown in FIG. 17, such that an annular support member 67 containing the coil springs 65 and having a projection 67b functioning equivalently to the projection 63b is fixed to a side surface of the radially inner portion 31a of the first driven gear 31 that faces the counter gear 32, and the friction damper 64 is disposed between the support member 67 and the counter gear 32. In the structure of FIG. 17, elements having the same or equivalent functions as those of the elements described in the sixth embodiment are denoted by the same reference numerals and characters.

Figure 18:
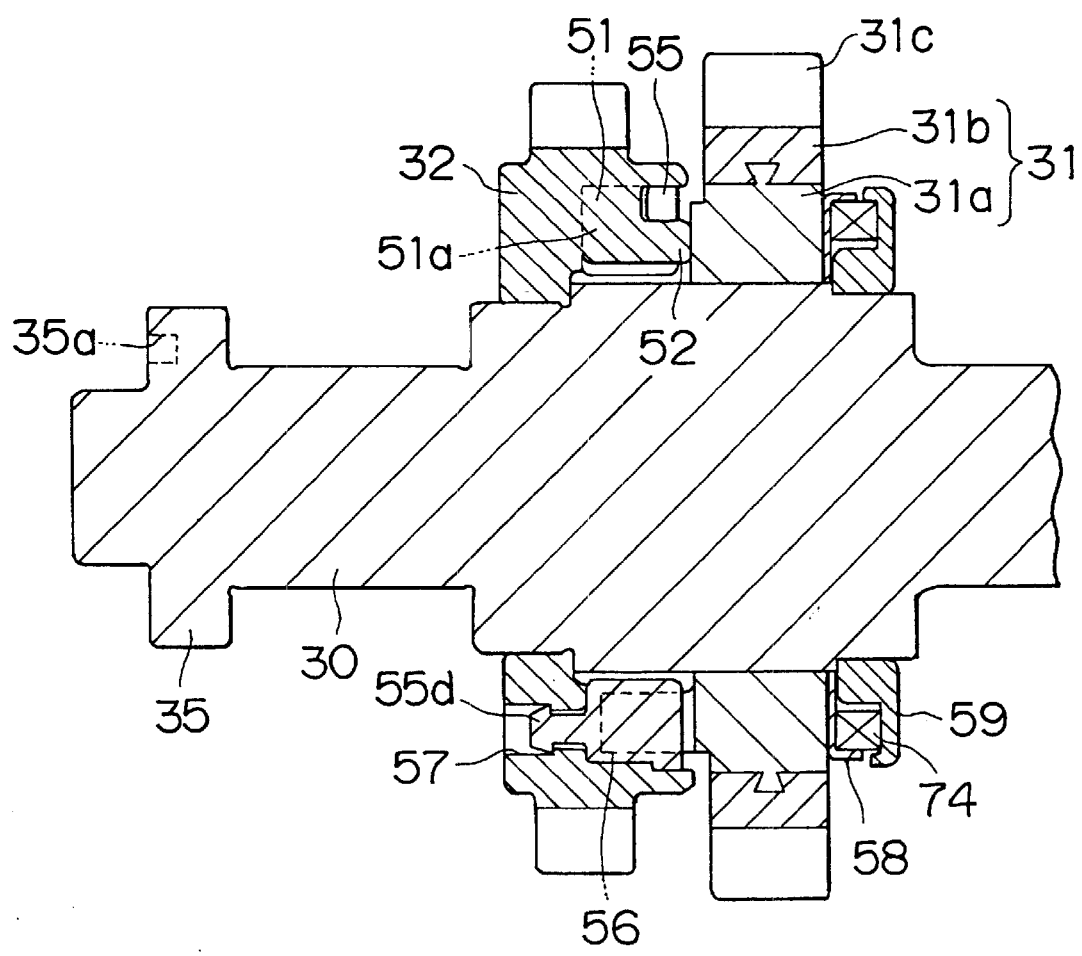
FIG. 18 is a cross-sectional view showing the construction of a damping mechanism in a modified example of the gear mechanisms of the first through fifth embodiments.

In the first through fifth embodiments, the gear mechanism may be modified as shown in FIG. 18: an annular support member 58 is fixed to a side surface of the radially inner portion 31a of the first driven gear 31 that is located remote from the counter gear 32. In addition, another annular support member 59 is fixed to the first balance shaft 30 so as to face the support member 58. Then, a friction damper 74 constructed similarly to the friction damper 54 used in the first embodiment is disposed between the support members 58 and 59.

While each of the friction dampers 54, 64 and 74 is constructed such that it includes a sliding portion and an elastic portion in the illustrated embodiments and the modification shown in FIG. 18, these friction dampers 54, 64 and 74 may alternatively be formed by a metal wave washer, a metal belleville spring, a metal wave spring, or the like.

In the sixth embodiment, the coil springs 65 are used as elastic members. However, an arc spring having a circular-arc shape, a spiral spring, or the like may alternatively be used. In either case, a material forming the spring is not limited to a metal, but may be a resin material or a ceramic material.

While four stopper rubbers 55 or three coil springs 65 are provided as elastic members in the illustrated embodiments, any number of stopper rubbers and coil springs may be provided.

While the first driven gear 31 and the second driven gear 41 are resin gears and the crank gear 21 and the counter gear 32 are metal gears in the illustrated embodiments, other structures may be employed provided at least one of the gears meshing with each other is a resin gear. For example, the crank gear 21 and the counter gear 32 may be resin gears, or the crank gear 21 and the second driven gear 41 may be resin gears.

Figure 19A:
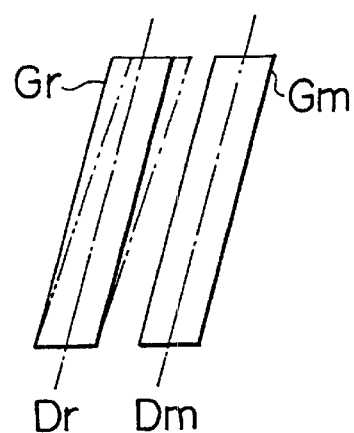
FIGS. 19A and 19B are schematic diagrams useful for explaining an engaging state of teeth of a resin gear with teeth of a metal gear.

As schematically shown in FIG. 19A, in the gear mechanism in which a resin gear and a metal gear formed as helical gears mesh with each other, a tooth-trace direction Dr of the resin gear Gr may be slightly changed with a temperature rise (refer to the two-dot chain line in FIG. 19A), even if the resin gear Gr is formed to have the tooth-trace direction Dr parallel to a tooth-trace direction Dm of the metal gear Gm.

When the tooth-trace direction Dr of the resin gear Gr is changed as described above, an uneven contact pressure is produced at the respective meshing surfaces of the resin gear Gr and the metal gear Gm. As a result, the meshing surface of the resin gear Gr may be worn at a portion that is subjected to a high contact pressure.

Such a temperature rise of the resin gear Gr is mainly caused by transmission of heat from the internal combustion engine. Therefore, the change in the tooth-trace direction Dr of the resin gear Gr is settled as the engine temperature rises to a predetermined level to achieve equilibrium after starting of the engine. Thereafter, the tooth-trace direction Dr is maintained approximately at the settled value.

Figure 19B:
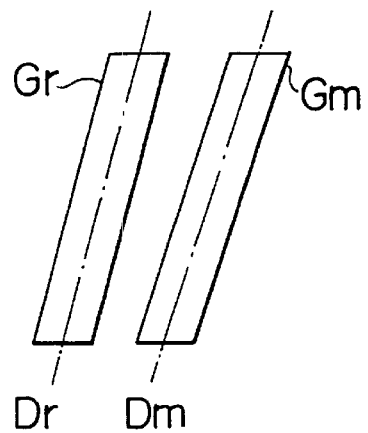

Thus, as shown in FIG. 19B, it is desirable to preset the tooth-trace direction Dm of the metal gear Gm in accordance with the resultant tooth-trace direction Dr of the resin gear Gr after the temperature rise. More specifically, in each of the illustrated embodiments, the tooth-trace direction of the crank gear 21 may be made parallel to the resultant tooth-trace direction of the first driven gear 31 after the temperature rise, and the tooth-trace direction of the counter gear 32 may be made parallel to the resultant tooth-trace direction of the second driven gear 41 after the temperature rise. With this arrangement, local wear of the resin gear and an increase in meshing noise due to local abutment of the gears can be suppressed.

In each of the illustrated embodiments, as shown in FIG. 5, the gear mechanism is constructed such that the rotational force of the crankshaft 20 is transmitted from the crank gear 21 to the first driven gear 31, and further transmitted from the first driven gear 31 to the counter gear 32 through the damping mechanism 50 (60), and then, transmitted from the counter gear 32 to the balance shafts 30 and 40. The gear mechanism, however, may be constructed otherwise.

Figure 20:
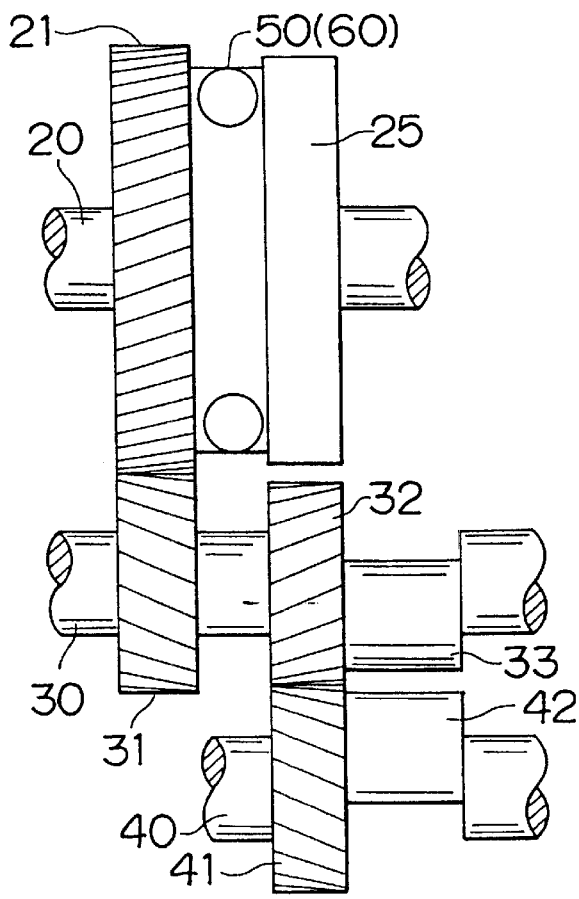
FIG. 20 is a schematic diagram showing a gear mechanism in which gears mesh with each other according to another embodiment of the present invention.

More specifically, as schematically shown in FIG. 20, the crank gear 21 that is rotatable relative to the crankshaft 20, and a plate 25 that is rotatable together with the crankshaft 20 are provided on the crankshaft 20. The crank gear 21 is operatively coupled with the plate 25 through the damping mechanism 50 (60). The first driven gear 31 and the counter gear 32 that are rotatable together with the first balance shaft 30 are provided on the first balance shaft 30, and the first driven gear 31 is meshed with the crank gear 21.

With the gear mechanism thus constructed, the rotational force of the crankshaft 20 is transmitted to the first balance shaft 30 through the damping mechanism 50 (60), the plate 25, the crank gear 21 and the first driven gear 31, and is also transmitted to the second balance shaft 40 through the counter gear 32 and the second driven gear 41.

The rotational force of the crankshaft 20 may alternatively be transmitted from the crank gear 21 to each of the balance shafts 30 and 40 via separate transmission paths.

Figure 21:
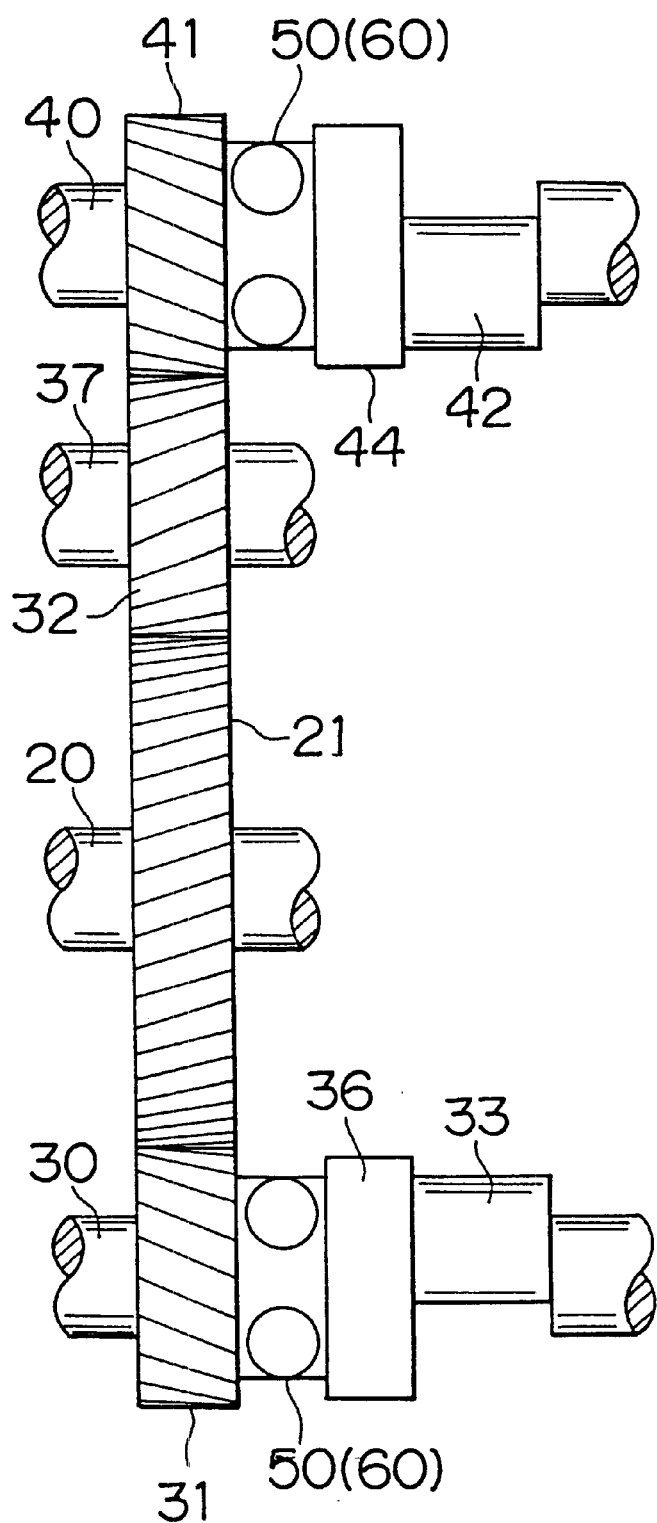
FIG. 21 is a schematic diagram showing a gear mechanism in which gears mesh with each other according to still another embodiment of the present invention.
Figure 22:
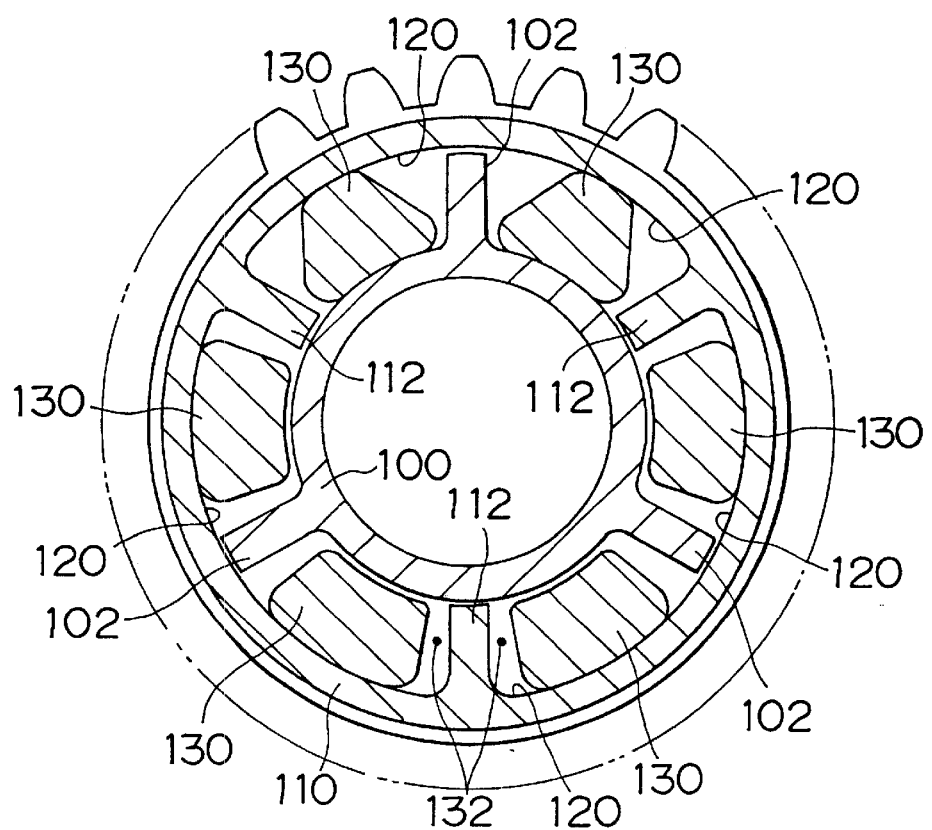
FIG. 22 is a cross-sectional view showing the construction of a damping mechanism in a conventional gear mechanism.
Figure 23:
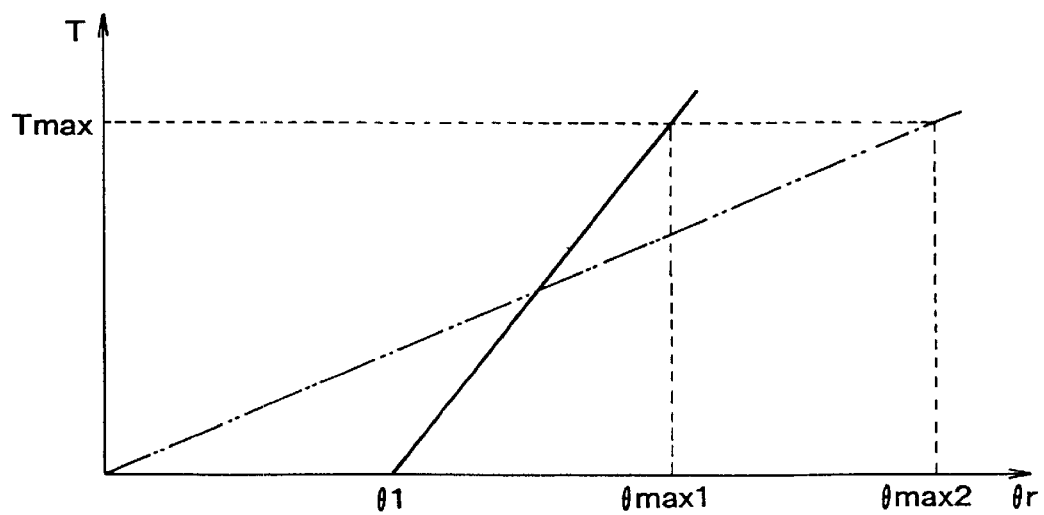
FIG. 23 is a graph showing the relationship between the amount of relative rotation of gears and the resultant elastic force generated in a damping mechanism.

More specifically, as schematically shown in FIG. 21, the first driven gear 31 that is rotatable relative to the first balance shaft 30, and a plate 36 that is rotatable together with the first balance shaft 30 are mounted on the first balance shaft 30. The first driven gear 31 is operatively coupled with the plate 36 via the damping mechanism 50 (60). Moreover, the second driven gear 41 that is rotatable relative to the second balance shaft 40, and a plate 44 that is rotatable together with the second balance shaft 40 are mounted on the second balance shaft 40. The second gear 41 is operatively coupled with the plate 44 via another damping mechanism 50 (60). In addition, the counter gear 32 that is mounted on a rotary shaft 37 different from the first balance shaft 30 is meshed with the crank gear 21 and the second driven gear 41.

With the gear mechanism thus constructed, the rotational force of the crankshaft 20 is transmitted from the crank gear 21 to the first balance shaft 30 through the first driven gear 31, the damping mechanism 50 (60) provided on the first balance shaft 30, and the plate 36. Moreover, the rotational force of the crankshaft 20 is also transmitted from the crank gear 21 to the second balance shaft 40 through the counter gear 32, the second driven gear 41, the damping mechanism 50 (60) provided on the second balance shaft 40, and the plate 44.

Even if the gear mechanism of each of the illustrated embodiments is modified as shown in each of the above-mentioned figures, the modified embodiments provides the same effects or advantages as described in each of the illustrated embodiments.

While the crank gear 21, the counter gear 32 and the driven gears 31 and 41 are all formed as helical gears in the illustrated embodiments, these gears may alternatively be formed as spur gears.

In the third embodiment, the tooth width of the resin gear (the first driven gear 31, the second driven gear 41) is set to 1.1 times that of the metal gear (the crank gear 21, the counter gear 32) that meshes with the resin gear. However, the tooth width of the resin gear may be set to any value as long as the tooth width of the resin gear is larger than that of the metal gear. In order to avoid an increase in the size of the resin gear, it is desirable to set the tooth width Br of the resin gear to be in the range of Bm<Br<1.5×Bm (where Bm is the tooth width of the metal gear). In the case where a plurality of resin gears are respectively meshed with a plurality of metal gears, respective tooth-width ratios of the resin gears to the metal gears need not be the same. For example, a tooth-width ratio of the first driven gear 31 to the crank gear 21 may be different from that of the second driven gear 41 to the counter gear 32.

In the fourth embodiment, the strength of the toothed portion of the second driven gear 41 is the same as that of the toothed portion of the first driven gear 31. However, the strength T3 of the toothed portion of the second driven gear 41 may be set to any value as long as the strength T3 and the breakage strength T2 of the projections 56 have the relationship of T2<T3.

In the illustrated embodiments, two pairs of unbalance weights 33 and 43 are provided on the respective balance shafts 30 and 40 so as to interpose the corresponding second radial bearings 16 therebetween. However, the position and the number of unbalance weights 33 and 43 are not limited to those of the above embodiments, and may be changed as desired.

The respective structures of the gear mechanisms as shown in the illustrated embodiments may be combined when appropriate. For example, the gear mechanism according to the second embodiment may be further provided with the structure of the third embodiment regarding the tooth width of the resin gear, the structure of the fourth embodiment for avoiding breakage of the resin gear upon application of excessive rotational force, and the structure of the fifth embodiment for dispersing or diversifying the natural frequency. Moreover, the gear mechanism of the sixth embodiment may include the respective structures as shown in the second through fifth embodiments.

While the gear mechanism is applied to the balancer apparatus of the internal combustion engine in the illustrated embodiments, the present invention is not limited to this, but the gear mechanism may alternatively be applied to another power transmitting system of the internal combustion engine.

What is claimed is:

1. A gear mechanism of a power transmitting system comprising first and second rotating members disposed coaxially with each other, and a damping mechanism interposed therebetween, said damping mechanism including a damping member that generates damping force for limiting relative rotation between the first and second rotating members, and at least one elastic member that elastically deforms mainly when an angle of relative rotation between the first and second rotating members exceeds a predetermined rotational angle, so as to apply elastic force onto the first and second rotating members in a direction opposite to that of the relative rotation, wherein said damping member comprises a friction damping member and said second rotating member comprises a rotary shaft, and said friction damping member is disposed between said first rotating member and said rotary shaft.

2. A gear mechanism of a power transmitting system comprising first and second rotating members disposed coaxially with each other, and a damping mechanism interposed therebetween, said damping mechanism including a damping member that generates damping force for limiting relative rotation between the first and second rotating members, and at least one elastic member that elastically deforms mainly when an angle of relative rotation between the first and second rotating members exceeds a predetermined rotational angle, so as to apply elastic force onto the first and second rotating members in a direction opposite to that of the relative rotation, wherein said elastic member comprises a main deformation portion and a sub deformation portion, and the main deformation portion has a greater deformation limit than the sub deformation portion.

3. A gear mechanism according to claim 2, wherein said main deformation portion and said sub deformation portion comprise a rubber material, said main deformation portion having an elastically deformable portion whose volume is larger than a volume of an elastically deformable portion of said sub deformation portion.

4. A gear mechanism according to claim 2, wherein said damping mechanism comprises a plurality of elastic members, each of which is provided on one of said first and second rotating members, and a plurality of abutting members corresponding to the respective elastic members, each of which is provided on the other of said first and second rotating members for abutting on the corresponding elastic members to cause elastic deformation thereof when the first and second rotating members rotate relative to each other beyond the predetermined relative rotational angle, and the elastic members are located with respect to the first and second rotating members such that different angles of relative rotation between the first and second rotating members are formed when the respective elastic members successively abut on the corresponding abutting members.

5. A gear mechanism of a power transmitting system comprising first and second rotating members disposed coaxially with each other, and a damping mechanism interposed therebetween, said damping mechanism including a damping member that generates damping force for limiting relative rotation between the first and second rotating members, and at least one elastic member that elastically deforms mainly when an angle of relative rotation between the first and second rotating members exceeds a predetermined rotational angle, so as to apply elastic force onto the first and second rotating members in a direction opposite to that of the relative rotation, wherein said damping mechanism comprises a plurality of said elastic members, each of which is provided on one of said first and second rotating members, and a plurality of abutting members corresponding to the respective elastic members, each of which is provided on the other of said first and second rotating members for abutting on the corresponding elastic members to cause elastic deformation thereof when the first and second rotating members rotate relative to each other beyond the predetermined relative rotational angle, and the elastic members are located with respect to the first and second rotating members such that different angles of relative rotation between the first and second rotating members are formed when the respective elastic members successively abut on the corresponding abutting members.

6. A gear mechanism of a power transmitting system comprising first and second rotating members disposed coaxially with each other, and a damping mechanism interposed therebetween, said damping mechanism including a damping member that generates damping force for limiting relative rotation between the first and second rotating members, and at least one elastic member that elastically deforms mainly when an angle of relative rotation between the first and second rotating members exceeds a predetermined rotational angle, so as to apply elastic force onto the first and second rotating members in a direction opposite to that of the relative rotation, wherein said damping mechanism comprises a plurality of said elastic members, each of which is provided on one of said first and second rotating members, and a plurality of abutting members corresponding to the respective elastic members, each of which is provided on the other of said first and second rotating members for abutting on the corresponding elastic members to cause elastic deformation thereof when the first and second rotating members rotate relative to each other beyond the predetermined relative rotational angle, and the predetermined relative rotational angle is defined by the sum of angles by which each said abutting member is spaced from corresponding end faces of said at least one elastic member which face the abutting member, as viewed in a direction of rotation of said rotating members.

7. A gear mechanism of a power transmitting system comprising first and second rotating members disposed coaxially with each other, and a damping mechanism interposed therebetween, said damping mechanism including a damping member that generates damping force for limiting relative rotation between the first and second rotating members, and at least one elastic member that elastically deforms mainly when an angle of relative rotation between the first and second rotating members exceeds a predetermined rotational angle, so as to apply elastic force onto the first and second rotating members in a direction opposite to that of the relative rotation, wherein said damping mechanism comprises a plurality of first elastic members, each of which is provided on one of said first and second rotating members, a plurality of abutting members corresponding to the respective first elastic members, each of which is provided on the other of said first and second rotating members, and a plurality of second elastic members that are interposed between corresponding end faces of the first elastic members and the abutting members; and each of the first elastic members has a spring constant and a damping coefficient that are smaller than a spring constant and a damping coefficient of each of the second elastic members.

8. A gear mechanism of a power transmitting system comprising first and second rotating members disposed coaxially with each other, and a damping mechanism interposed therebetween, said damping mechanism including a damping member that generates damping force for limiting relative rotation between the first and second rotating members, and at least one elastic member that elastically deforms mainly when an angle of relative rotation between the first and second rotating members exceeds a predetermined rotational angle, so as to apply elastic force onto the first and second rotating members in a direction opposite to that of the relative rotation, wherein at least one of said first and second rotating members comprises a gear meshing with a respective counter gear.

9. A gear mechanism according to claim 8, wherein at least one of said gears is a resin gear whose teeth comprise a resin material.

10. A gear mechanism according to claim 9, wherein a respective gear meshing with said resin gear is a metal gear whose teeth comprise a metal, and wherein said resin gear has a tooth width that is larger than a tooth width of the metal gear.

11. A gear mechanism according to claim 10, wherein said damping mechanism further comprises at least one abutting member adapted for abutting on the corresponding elastic members to cause elastic deformation thereof when the first and second rotating members rotate relative to each other beyond the predetermined relative rotational angle, and a strength of each said abutting member as measured upon breakage of the abutting member due to elastic force of the corresponding elastic member acting thereon is set to be smaller than a strength of a toothed portion of said gears.

12. A gear mechanism according to claim 9, wherein said damping mechanism further comprises at least one abutting member adapted for abutting on the corresponding elastic members to cause elastic deformation thereof when the first and second rotating members rotate relative to each other beyond the predetermined relative rotational angle, and a strength of each said abutting member as measured upon breakage of the abutting member due to elastic force of the corresponding elastic member acting thereon is set to be smaller than a strength of a toothed portion of said gears.

13. A gear mechanism according to claim 8, wherein said damping mechanism further comprises at least one abutting member adapted for abutting on the corresponding elastic members to cause elastic deformation thereof when the first and second rotating members rotate relative to each other beyond the predetermined relative rotational angle, and a strength of each said abutting member as measured upon breakage of the abutting member due to elastic force of the corresponding elastic member acting thereon is set to be smaller than a strength of a toothed portion of said gears.

14. A gear mechanism according to claim 8, wherein said damping mechanism comprises a plurality of said elastic members, each of which is provided on one of said first and second rotating members, and a plurality of abutting members corresponding to the respective elastic members, each of which is provided on the other of the first and second rotating members for abutting on the corresponding elastic members to cause elastic deformation thereof when said rotating members rotate relative to each other beyond the predetermined relative rotational angle, wherein the elastic members and said abutting members are located with respect to said rotating members such that the elastic members and said abutting members are spaced from each other at equal intervals in a direction of rotation of said rotating members; and the first rotating member comprises a gear to be coupled by the gear mechanism, and the number of teeth of the gear is set to an integral multiple of the number of the elastic members.

15. An internal combustion engine comprising a crankshaft, a first balance shaft and a gear mechanism of a power transmitting system comprising first and second rotating members disposed coaxially with each other, and a damping mechanism interposed therebetween, said damping mechanism including a damping member that generates damping force for limiting relative rotation between the first and second rotating members, and at least one elastic member that elastically deforms mainly when an angle of relative rotation between the first and second rotating members exceeds a predetermined rotational angle, so as to apply elastic force onto the first and second rotating members in a direction opposite to that of the relative rotation, wherein said first balance shaft is driven by rotational torque of said crankshaft.

16. An internal combustion engine according to claim 15, wherein said gear mechanism is arranged at said first balance shaft and comprises a driven gear being disposed on said first balance shaft and rotatable relative thereto, and said driven gear is driven by a crank gear fixedly secured on said crankshaft.

17. An internal combustion engine according to claim 16, wherein a second balance shaft is operatively coupled with said first balance shaft.

18. An internal combustion engine according to claim 16, wherein a second balance shaft is driven by said crankshaft via said crank gear, an intermediate gear being disposed on an intermediate shaft and meshing with said crank gear, a driven gear being disposed on said second balance shaft and rotatable relative thereto and meshing with said intermediate gear, and an additional gear mechanism connecting said driven gear and said second balance shaft with each other.

19. An internal combustion engine according to claim 15, wherein said gear mechanism is arranged at said crank shaft and comprises a crank gear disposed on said crankshaft and rotatable relative thereto, and said crank gear drives a driven gear fixedly secured on said first balance shaft.

20. An internal combustion engine according to claim 19, wherein a second balance shaft is operatively coupled with said first balance shaft.

* * * * *